US012738617B2

(12) United States Patent
Liang

(10) Patent No.: US 12,738,617 B2
(45) Date of Patent: Sep. 15, 2026

(54) TRANSFORMATIVE APPARATUS, ARRAYED TRANSFORMATIVE APPARATUS, AND COMMUNICATION DEVICE

(71) Applicant: HUAWEI TECHNOLOGIES CO., LTD., Shenzhen (CN)

(72) Inventor: Yuan Liang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 51 days.

(21) Appl. No.: 18/775,978

(22) Filed: Jul. 17, 2024

(65) Prior Publication Data

US 2024/0372237 A1 Nov. 7, 2024

Related U.S. Application Data

(63) Continuation of application No. PCT/CN2023/074752, filed on Feb. 7, 2023.

(30) Foreign Application Priority Data

Feb. 10, 2022 (CN) ......................... 202210125816.1

(51) Int. Cl.

| | |
|---|---|
| ***H01P 1/16*** | (2006.01) |
| ***H01P 3/08*** | (2006.01) |
| ***H01Q 13/02*** | (2006.01) |

(52) U.S. Cl.

CPC .................. *H01P 1/16* (2013.01); *H01P 3/08* (2013.01); *H01Q 13/025* (2013.01)

(58) Field of Classification Search

CPC .... H01P 1/16; H01P 3/08; H01P 5/107; H01P 5/08; H01P 5/103; H01Q 13/025

See application file for complete search history.

(56) References Cited

U.S. PATENT DOCUMENTS

| | | | | |
|---|---|---|---|---|
| 4,596,047 A | 6/1986 | Watanabe et al. | | |
| 8,441,405 B2 * | 5/2013 | Tsutsumi | ................ | H01P 5/107 343/771 |

(Continued)

FOREIGN PATENT DOCUMENTS

| | | |
|---|---|---|
| CN | 106033843 A | 10/2016 |
| EP | 3240101 B1 | 7/2020 |

(Continued)

*Primary Examiner* — Seung H Lee

(74) *Attorney, Agent, or Firm* — WOMBLE BOND DICKINSON (US) LLP

(57) ABSTRACT

A transformative apparatus includes a transmission member, a converter antenna, a first waveguide, and a first guiding member. The transmission member is configured to receive and transmit an electrical signal having a first mode. The converter antenna is configured to receive the electrical signal from the transmission member, form local radiation, and excite an electrical signal having a second mode in the first waveguide. The first waveguide is configured to receive and transmit the electrical signal having the second mode. The first guiding member is configured to guide an electrical signal output from the converter antenna into the first waveguide. The transformative apparatus changes a mode of an electrical signal on the transmission member by using the converter antenna, and guides the electrical signal to the first waveguide by using the first guiding member.

20 Claims, 19 Drawing Sheets

(56) References Cited

U.S. PATENT DOCUMENTS

| | | | | |
|---|---|---|---|---|
| 9,912,068 | B2 * | 3/2018 | Shijo | H01Q 13/22 |
| 12,261,345 | B2 * | 3/2025 | Mehmood | H01P 3/026 |
| 2020/0303802 | A1 | 9/2020 | Hsiao et al. | |

FOREIGN PATENT DOCUMENTS

| | | | |
|---|---|---|---|
| GB | 2438261 | A | 11/2007 |
| JP | 2011239258 | A | 11/2011 |
| WO | 2011136737 | A1 | 11/2011 |

* cited by examiner

TRANSFORMATIVE APPARATUS, ARRAYED TRANSFORMATIVE APPARATUS, AND COMMUNICATION DEVICE

CROSS-REFERENCE TO RELATED APPLICATIONS

This application is a continuation of International Application No. PCT/CN2023/074752, filed on Feb. 7, 2023, which claims priority to Chinese Patent Application No. 202210125816.1, filed on Feb. 10, 2022. The disclosures of the aforementioned applications are hereby incorporated by reference in their entireties.

TECHNICAL FIELD

This disclosure relates to the field of communication technologies, and in particular, to a transformative apparatus, an arrayed transformative apparatus, and a communication device.

BACKGROUND

An electrical signal transmission condition in an existing communication system is complex. To meet requirements of indicators such as costs, a loss, a power capacity, and reliability, and to meet different requirements imposed due to different features of different transmission lines, transmission lines corresponding to different transmission conditions are usually used. It is not difficult to learn of transformation between different transmission lines in many places in the communication system, and efficiency is quite important. It is quite common to perform structure transformation between a planar transmission line suitable for a circuit process and a low-loss waveguide.

However, there is a problem that a microwave cannot be efficiently transferred between different types of transmission lines, and it is difficult to ensure stability and continuity of an electrical signal transmitted between the different types of transmission lines.

SUMMARY

An objective of this disclosure is to provide a transformative apparatus, an arrayed transformative apparatus, and a communication device. The transformative apparatus provided in this disclosure can reduce a leakage of an electrical signal in a transfer process between different types of transmission lines, so that the electrical signal can be stably and efficiently transmitted between the different types of transmission lines.

According to a first aspect, this disclosure provides a transformative apparatus. The transformative apparatus provided in this disclosure includes a first substrate, a transmission member, a converter antenna, and a first waveguide, where the first waveguide and the transmission member and converter antenna are respectively fastened on two sides of the first substrate, the transmission member is configured to receive and transmit an electrical signal having a first mode, the converter antenna is connected to the transmission member, and is configured to: receive the electrical signal from the transmission member, form local radiation, and excite an electrical signal having a second mode in the first waveguide, and the first waveguide is configured to receive and transmit the electrical signal having the second mode.

In addition, the transformative apparatus further includes a first guiding member, where the first guiding member is fastened between the first substrate and the first waveguide, an extension direction of the first guiding member is a first direction, the first direction is parallel to a polarization direction of the second mode, and the first guiding member is configured to guide an electrical signal output from the converter antenna into the first waveguide.

In this disclosure, the transformative apparatus changes the mode of the electrical signal on the transmission member by using the converter antenna, to receive the electrical signal from the transmission member, form local radiation, and excite the electrical signal having the second mode in the first waveguide. This reduces a leakage of the electrical signal in a transfer process from the transmission member to the first waveguide, and improves transfer efficiency of the electrical signal between different types of transmission lines, so that the electrical signal can be stably and efficiently transmitted.

In some embodiments, the first waveguide includes a hollow metal structure, and the first guiding member is connected to the hollow metal structure, or the first guiding member is located inside the hollow metal structure.

In this embodiment, the first guiding member is connected to the hollow metal structure of the first waveguide, so that an induced current on the first guiding member can be directly transmitted to the first waveguide. This reduces a loss and improves transmission efficiency.

In addition, the first guiding member is located inside the hollow metal structure of the first waveguide, that is, the first guiding member is not in contact with the hollow metal structure of the first waveguide. In this case, the induced current on the first guiding member is transferred to the first waveguide in an indirect coupling manner.

In some embodiments, a region of a projection of the first waveguide onto a first plane is a first projection region, the first plane is parallel to a surface that is of the first substrate and that faces the first waveguide, and at least a part of the first guiding member falls into the first projection region.

In this embodiment, at least a part of the first guiding member falls into the first projection region, to restrict the electrical signal inside the first waveguide. This reduces a leakage of the electrical signal in a transfer process and improves transfer efficiency.

In some embodiments, the converter antenna includes a first radiator and a second radiator, and extension directions of the first radiator and the second radiator are both parallel to the first direction.

In this embodiment, an extension direction of the converter antenna is parallel to the first direction, that is, the extension direction of the converter antenna is parallel to the extension direction of the first guiding member, so that an induced current in the first mode can be excited on the first guiding member.

In some embodiments, a region of projections of the first radiator and the second radiator onto the first plane is a second projection region, and at least a part of the first guiding member falls into the second projection region.

In this embodiment, at least a part of the first guiding member falls into the second projection region, so that the first radiator and the second radiator can excite an induced current on the first guiding member in a coupled transmission manner.

In some embodiments, the first guiding member, the first radiator, and the second radiator are all of a bar-like structure, and a middle line of the first guiding member coincides with a middle line of the first radiator and/or a middle line of the second radiator.

In this embodiment, the middle line of the first guiding member coincides with the middle line of the first radiator and/or the middle line of the second radiator, that is, the first guiding member may be located right above the converter antenna, to improve coupling efficiency.

In some embodiments, the transformative apparatus further includes a second waveguide, the second waveguide is located on a side that is of the transmission member and the converter antenna and that faces away from the first substrate, and the second waveguide is fastened to the first substrate.

In this embodiment, the second waveguide may also include a hollow metal structure, and an end part that is of the second waveguide and that is away from a planar transmission assembly is of a sealed structure, to implement a short circuit, so that the electrical signal is transmitted between the first waveguide and the planar transmission assembly. For example, the electrical signal may be transmitted bidirectionally between the first waveguide and the planar transmission assembly, that is, the electrical signal may be transmitted from the first waveguide to the planar transmission assembly, or may be transmitted from the planar transmission assembly to the first waveguide.

In addition, the end part that is of the second waveguide and that is away from the planar transmission assembly may alternatively be of an opening structure. In this case, the electrical signal may be transmitted from the planar transmission assembly to the first waveguide and the second waveguide on two sides. This increases transmission paths, connects the waveguides to more communication structures, and improves transmission efficiency.

In some embodiments, the transformative apparatus includes a planar transmission assembly, the planar transmission assembly includes the first substrate, the transmission member, the converter antenna, and the first guiding member, and a manner of fastening between the first waveguide and the planar transmission assembly is the same as a manner of fastening between the planar transmission assembly and the second waveguide.

In this embodiment, the transformative apparatus is highly modularized and integrated. This can reduce a space occupation rate of the transformative apparatus in a communication device and disassembly and maintenance costs, and facilitate large-scale production of the transformative apparatus.

In some embodiments, the first waveguide falls into a range of a region of a projection of the first substrate onto the first plane.

In this embodiment, the first waveguide falls into the range of the region of the projection of the first substrate onto the first plane, so that the planar transmission assembly can completely separate the first waveguide and the second waveguide into two independent parts.

In some embodiments, the transformative apparatus further includes a second substrate and an adjustable material layer, the second substrate is fastened to the first substrate and is disposed opposite to the first substrate, the second substrate is located on the side that is of the transmission member and the converter antenna and that faces away from the first substrate, and the adjustable material layer is filled between the first substrate and the second substrate.

In this embodiment, the adjustable material layer is configured to regulate an output signal of the planar transmission assembly.

In some embodiments, the transformative apparatus further includes a second guiding member, the second guiding member is located between the second substrate and the second waveguide, an electrical signal transmitted in the second waveguide has the second mode, and an extension direction of the second guiding member is parallel to the first direction, and the second guiding member is configured to guide the electrical signal output from the converter antenna into the second waveguide.

In this embodiment, the electrical signal may be transmitted from the planar transmission assembly to the first waveguide and the second waveguide on two sides. This increases transmission paths, connects the waveguides to more communication structures, and improves transmission efficiency.

In some embodiments, the converter antenna includes the first radiator and the second radiator, the first radiator includes a first portion, a second portion, and a third portion that are sequentially connected, the first portion, the second portion, and the third portion of the first radiator form a U shape, the second radiator also includes a first portion, a second portion, and a third portion that are sequentially connected, the first portion, the second portion, and the third portion of the second radiator form an inverse U shape, extension directions of the first portion of the first radiator and the first portion of the second radiator are both parallel to the first direction, the first portion of the first radiator and the first portion of the second radiator form a first converter antenna, extension directions of the third portion of the first radiator and the third portion of the second radiator are both parallel to the first direction, and the third portion of the first radiator and the third portion of the second radiator form a second converter antenna.

There are two first guiding members, and the two first guiding members are respectively disposed corresponding to the first converter antenna and the second converter antenna.

In this embodiment, the converter antenna is of a dual-dipole structure, so that an input direction of an electrical signal of the planar transmission assembly can be changed.

According to a second aspect, this disclosure further provides an arrayed transformative apparatus. The arrayed transformative apparatus provided in this disclosure includes a plurality of transformative apparatuses.

In this disclosure, the arrayed transformative apparatus can reduce a leakage of an electrical signal in a transfer process between different types of transmission lines, so that the electrical signal can be stably and efficiently transmitted between the different types of transmission lines.

According to a third aspect, this disclosure provides a communication device. The communication device provided in this disclosure includes a transformative apparatus.

In this disclosure, the communication device can reduce a leakage of an electrical signal in a transfer process between different types of transmission lines, so that the electrical signal can be stably and efficiently transmitted between the different types of transmission lines.

According to a fourth aspect, this disclosure further provides a communication device. The communication device provided in this disclosure includes an arrayed transformative apparatus.

In this disclosure, the communication device can reduce a leakage of an electrical signal in a transfer process between different types of transmission lines, so that the electrical signal can be stably and efficiently transmitted between the different types of transmission lines.

DESCRIPTION OF EMBODIMENTS

The following describes embodiments of this disclosure with reference to the accompanying drawings in embodiments of this disclosure. In the descriptions of embodiments of this disclosure, "a plurality of" means two or more than two, unless otherwise specified. In addition, the "connection" in this specification should be understood in a broad sense. For example, the "connection" may be a detachable connection, a non-removable connection, a direct connection, or an indirect connection through an intermediate medium. In addition, "fastened" in this specification should also be understood in a broad sense. For example, "fastened" may be directly fastened, or may be indirectly fastened by using an intermediate medium.

Figure 1:
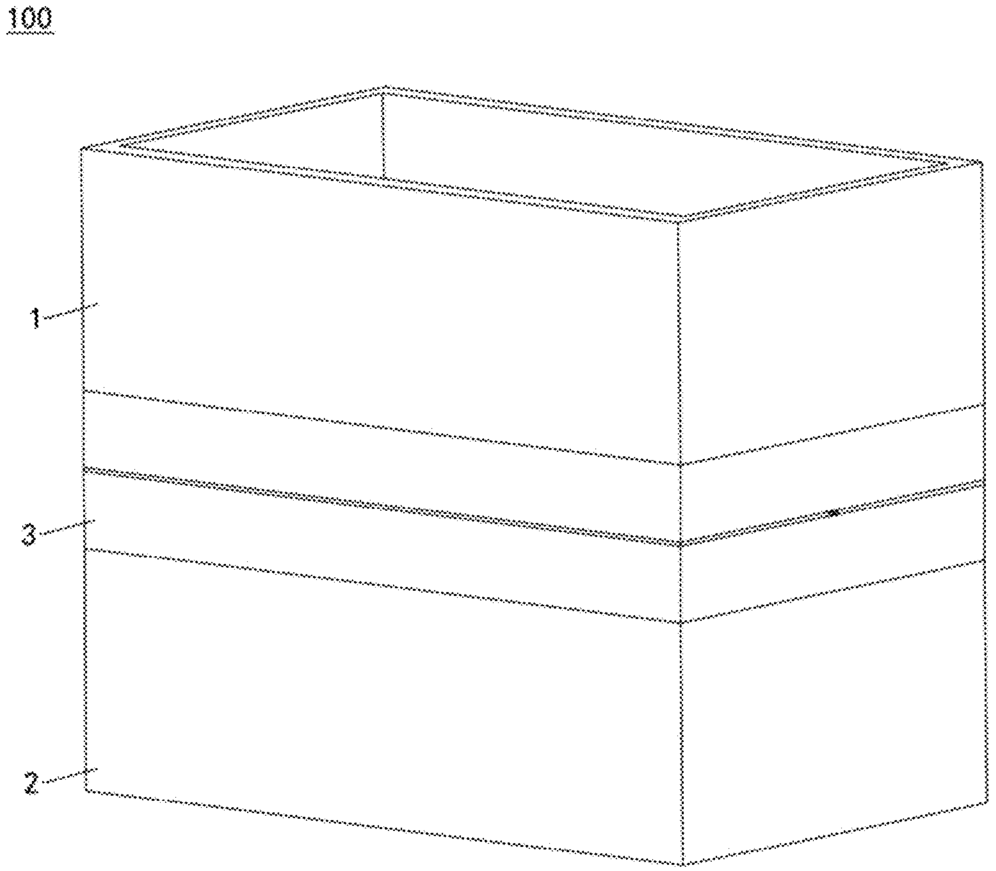
FIG. 1 is a diagram of a structure of a transformative apparatus in some embodiments according to this disclosure.

FIG. 1 is a diagram of a structure of a transformative apparatus 100 in some embodiments according to this disclosure. For example, the transformative apparatus 100 may be used in a communication device. The communication device may be configured to transmit an electrical signal. A plurality of communication devices may form a communication system. Specifically, the plurality of communication devices have a specific function, interact with each other, and depend on each other, to form an organic whole for achieving a unified objective. A communication system usually includes a signal source (e.g. a communication device at a transmit end), a signal sink (e.g. a communication device at a receive end), a channel (e.g. a transmission medium), and the like, to complete an electrical signal transmission process.

For example, communication devices are classified into wired communication devices and wireless communication devices. The wired communication device may include serial communication, professional bus communication, industrial Ethernet communication, and a transformative device between various communication protocols. The wireless communication device may include devices such as a wireless access point (e.g. hotspot), a wireless bridge, a wireless network adapter, a wireless lightning arrester, and an antenna.

For example, the communication device may include a structure such as a transmitter, a receiver, and/or an antenna. A transmission line is connected between the foregoing structures, and is configured to enable the foregoing structures to be in a communication connection, to transmit an electrical signal.

For example, the communication device transmits an electrical signal by using a plurality of types of transmission lines. The electrical signal may be an electromagnetic wave that carries specific information, and the electromagnetic wave can be propagated along a transmission line, to implement transmission of the electrical signal. The transmission line includes any linear structure that transmits an electromagnetic wave between endpoints of the transmission line. The transmission line is mainly configured to transmit microwaves. The microwaves refer to electromagnetic waves whose frequencies range from 300 MHz to 300 GHz.

For example, the transmission line may include a waveguide, a microstrip, a strip line, a coaxial line, a coplanar waveguide, a slotline, a parallel line, and the like.

In this disclosure, the waveguide is specifically a hollow metal structure configured to transmit an electromagnetic wave.

The microstrip may include a dielectric substrate and a strip fastened to the dielectric substrate. Because one side of the strip is a dielectric (e.g. a dielectric substrate), and the other side is air, and a relative dielectric constant of the dielectric may be greater than a relative dielectric constant of the air, a transmission speed of an electrical signal in the microstrip is high. This facilitates transmission of a signal that has a high requirement for a speed.

The strip line includes two dielectric substrates and a strip located between the two dielectric substrates. Because the strip of the strip line is located between the two dielectric substrates, an electrical signal transmitted along the strip of the strip line is less affected by the outside.

The coaxial line may be a microwave transmission structure including two coaxial cylindrical conductors, and air or a high-frequency medium is filled between the inner and the outer cylindrical conductors. A conductor located on an outer side of the coaxial line may be grounded, and an electromagnetic field of the electrical signal transmitted on the coaxial line is limited between an inner conductor and an outer conductor, so that the coaxial line basically has no radiation loss, is hardly interfered by an external signal, and has a wide operating frequency band.

In addition, when an electromagnetic wave is propagated in free space, a propagation direction is not limited. When the electromagnetic wave is propagated in a transmission line, the electromagnetic wave is limited in one dimension. In this case, mode distribution is generated in a limited direction. A propagation mode of the electromagnetic wave is a definite electromagnetic field distribution rule that may exist independently, that is, a polarization direction of the electromagnetic field. The electromagnetic wave may have modes such as a transverse electromagnetic (TEM) wave, a transverse electric (TE) wave, a transverse magnetic (TM) wave, a quasi-TEM, a quasi-TE, a longitudinal section electric (LSE) wave, and a longitudinal section magnetic (LSM) wave. The propagation mode of the electromagnetic wave is related to a shape and a size of a cross section of the transmission line. Due to limitations on cross-sectional shapes and sizes of different types of transmission lines, different types of transmission lines have corresponding specific modes, and only electromagnetic waves that can meet a specific propagation mode can be propagated on the corresponding transmission lines. The mode of the transmission line can be solved through a combination of Maxwell's equations and a boundary condition of the transmission line, and the boundary condition of the transmission line is determined by the shape and the size of the cross section of the transmission line.

For example, a rectangular waveguide may transmit an electromagnetic wave in a $TE_{10}$ mode, and a circular waveguide may transmit an electromagnetic wave in a $TE_{11}$ mode. In addition, a size of the transmission line is adjusted, so that single-mode transmission and multi-mode transmission of the transmission line can also be controlled. For an electromagnetic wave with a definite frequency, a transmission line size is appropriately selected to cut off a higher-order mode and transmit only a dominant mode, that is, single-mode transmission. The multi-mode transmission allows simultaneous transmission of the dominant mode and one or more higher-order modes.

Because different types of transmission lines have different modes, a transformative structure needs to be disposed between the different types of transmission lines, and the transformative structure is configured to convert a mode of an electromagnetic wave. For example, a mode of an electrical signal transmitted on a first transmission line matches the first transmission line, and a mode of an electrical signal transmitted on a second transmission line matches the second transmission line. In a process in which the electrical signal is transferred from the first transmission line to the second transmission line, a mode is changed by using the transformative structure, so that the mode of the electrical signal matches the second transmission line, and the electrical signal can be transferred from the first transmission line to the second transmission line and transmitted along the second transmission line. The first transmission line and the second transmission line may be of a same type, but corresponding electrical signal modes are different. Alternatively, the first transmission line and the second transmission line may be of different types. This disclosure is described by using an example in which the first transmission line and the second transmission line are of different types.

Figure 2:
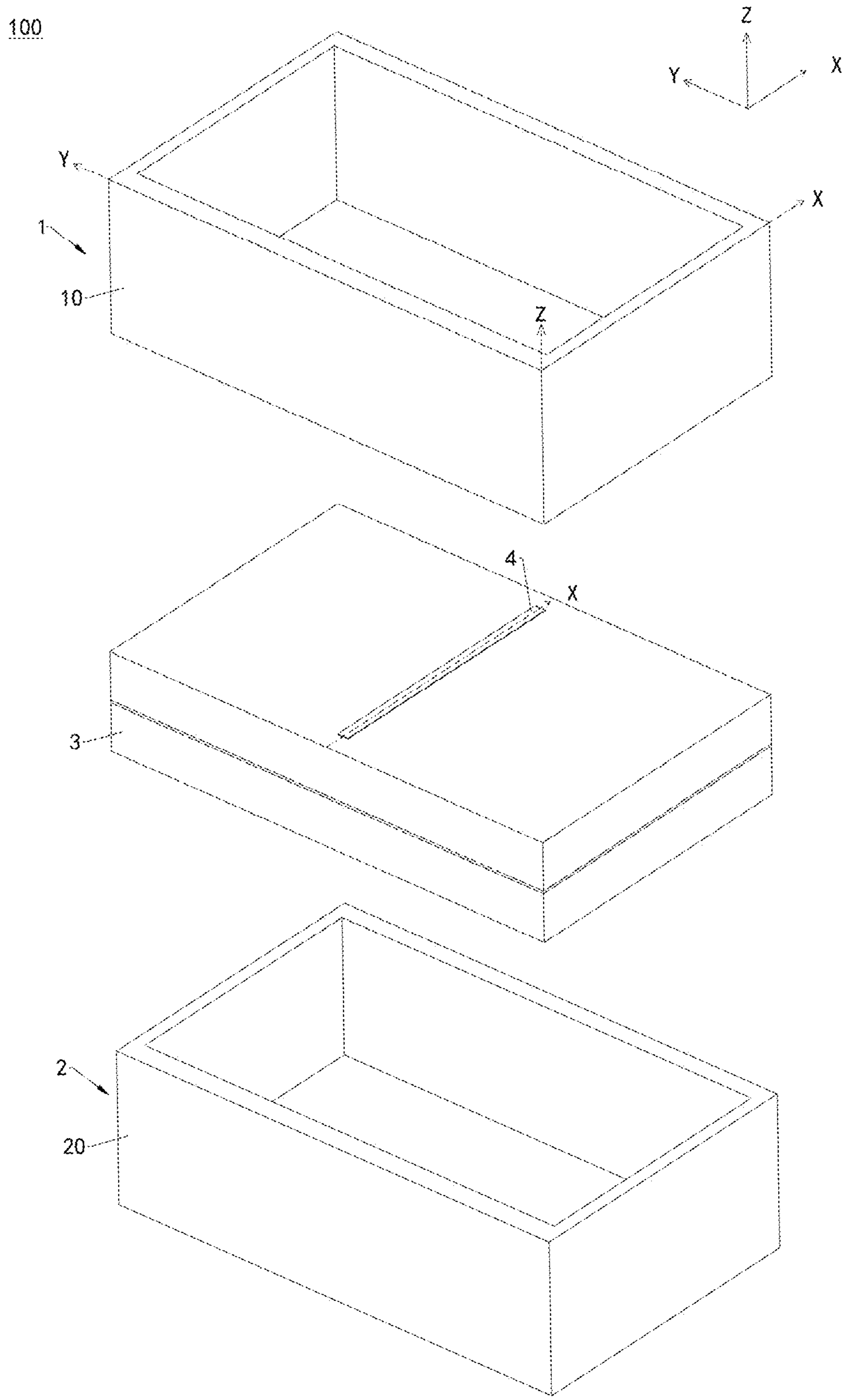
FIG. 2 is an exploded view of a part of the structure of the transformative apparatus shown in FIG. 1.

Refer to FIG. 1 and FIG. 2. FIG. 2 is an exploded view of a part of the structure of the transformative apparatus 100 shown in FIG. 1.

For example, the transformative apparatus 100 may include a first waveguide 1, a second waveguide 2, and a planar transmission assembly 3 fastened between the first waveguide 1 and the second waveguide 2. The planar transmission assembly 3 is configured to receive and transmit an electrical signal having a first mode, and output an electrical signal having a second mode. The first waveguide 1 may include a hollow metal structure 10, configured to receive and transmit the electrical signal having the second mode. A middle part of the hollow metal structure 10 may be filled with air, or may be filled with another medium. The medium can support the hollow metal structure 10 and maintain a shape of the hollow metal structure 10.

For example, the planar transmission assembly 3 may include a first guiding member 4, that is, the transformative apparatus 100 may include the first guiding member 4. The first guiding member 4 is located on a side that is of the planar transmission assembly 3 and that faces the first waveguide 1, and an extension direction of the first guiding member 4 is a first direction X. In this disclosure, the first direction X is parallel to a polarization direction of the second mode corresponding to the first waveguide 1, and is configured to guide the electrical signal output by the planar transmission assembly 3 into the first waveguide 1, or guide an electrical signal output by the first waveguide 1 into the planar transmission assembly 3, to reduce a leakage of the electrical signal in a transfer process between the planar transmission assembly 3 and the first waveguide 1, that is, a leakage in a transfer process between different types of transmission lines, and improve transfer efficiency. In this disclosure, a direction from one end of any structure to the other end is defined as an extension direction of the structure. Any structure may include the first guiding member 4, and a first strip 33, a second strip 34, a first radiator 361, a second radiator 362, a main body 333, a branch 334, a strip **38*b*, and the like in the following. For example, the extension direction of the first guiding member 4 is a direction in which one end of the first guiding member 4 points to the other end. In addition, in this disclosure, provided that some electrical signals in electrical signals output by a transmission line of one type have not entered a transmission line of another type or are not transmitted along the transmission line of another type, it may be considered that a "leakage" of the electrical signals occurs in a transfer process between different types of transmission lines. For example, provided that some electrical signals in the electrical signals output by the planar transmission assembly 3 have not entered the first waveguide 1 or are not transmitted along the first waveguide 1, it may be considered that a leakage of the electrical signals occurs in a transfer process between the planar transmission assembly 3 and the For example, the first waveguide 1 may include the hollow metal structure 10. For example, the hollow metal structure 10 may be a rectangle. The first waveguide 1 has two short edges disposed opposite to each other and two long edges disposed opposite to each other. When the first waveguide 1 is of the rectangular hollow metal structure 10, the second mode may be a $TE_{10}$ mode, and a direction of the short edge of the first waveguide 1 is parallel to a polarization direction of the $TE_{10}$ mode, that is, the direction of the short edge of the first waveguide 1 is parallel to the first direction X. In this disclosure, a direction of the long edge of the first waveguide 1** is defined as a second direction Y, a plane parallel to the first direction X and the second direction Y is defined as a first plane XY, and a direction perpendicular to the first plane XY is defined as a third direction Z.

In some other embodiments, the first waveguide 1 may alternatively be of a square tubular structure, a circular tubular structure, or an elliptical tubular structure. An example in which the first waveguide 1 is of the circular tubular structure is used, and a cross section of the circular tubular structure is a concentric circle. In this embodiment, the second mode may alternatively be a $TE_{11}$ mode, and a polarization direction of the $TE_{11}$ mode passes through a center of the cross section of the circular tubular structure, that is, the first direction X is parallel to a direction of the center of the cross section of the circular tubular structure.

For example, an extension direction of the first waveguide 1 and/or an extension direction of the second waveguide 2 may be parallel to the third direction Z. In this case, a plane on which an opening of the first waveguide 1 and/or an opening of the second waveguide 2 are/is located may be parallel to the plane XY. In some other embodiments, the extension direction of the first waveguide 1 and/or the extension direction of the second waveguide 2 may be inclined or bent relative to the third direction Z. In this case, there may alternatively be an included angle between the plane XY and the plane on which the opening of the first waveguide 1 and/or the opening of the second waveguide 2 are/is located. This is not limited in this disclosure.

For example, the first guiding member 4 may be made of a metal material, for example, gold, silver, or copper. This is not limited in this disclosure.

The second waveguide 2 may also include a hollow metal structure 20, and an end part that is of the second waveguide 2 and that is away from a planar transmission assembly 3 is of a sealed structure, to implement a short circuit, so that the electrical signal is transmitted between the first waveguide 1 and the planar transmission assembly 3. For example, the electrical signal may be transmitted bidirectionally between the first waveguide 1 and the planar transmission assembly 3, that is, the electrical signal may be transmitted from the first waveguide 1 to the planar transmission assembly 3, or may be transmitted from the planar transmission assembly 3 to the first waveguide 1.

In some other embodiments, the end part that is of the second waveguide 2 and that is away from the planar transmission assembly 3 may alternatively be of an opening structure. In this case, the electrical signal may be transmitted from the planar transmission assembly 3 to the first waveguide 1 and the second waveguide 2 on two sides. This increases transmission paths, connects the waveguides to more communication structures, and improves transmission efficiency. In addition, if frequencies of electrical signals transmitted in the first waveguide 1 and the second waveguide 2 are the same, the electrical signals may also be transmitted from the first waveguide 1 and the second waveguide 2 to the planar transmission assembly 3. In this embodiment, the first guiding member 4 may alternatively be located between the planar transmission assembly 3 and the second waveguide 2, and is configured to guide the electrical signal output by the planar transmission assembly 3 into the second waveguide 2, or guide an electrical signal output by the second waveguide 2 into the planar transmission assembly 3. This reduces a leakage of the electrical signal in a transfer process and improves transfer efficiency. In addition, there may alternatively be two first guiding members 4, and the two first guiding members 4 may be respectively located between the planar transmission assembly 3 and the first waveguide 1 and between the planar transmission assembly 3 and the second waveguide 2, and are configured to guide the electrical signal output by the planar transmission assembly 3 into the first waveguide 1 and the second waveguide 2, or guide the electrical signals output by the first waveguide 1 and the second waveguide 2 into the planar transmission assembly 3. This reduces a leakage of the electrical signal in a transfer process and improves transfer efficiency.

For example, a shape of a cross section of the metal structure 20 may be a rectangle, or may be a square, a circle, or an ellipse. This is not limited in this disclosure. In this disclosure, the cross section of the metal structure 20 is a region enclosed by an outer contour that is of the metal structure 20 and that is parallel to the first plane XY.

For example, mechanical processing is performed on a metal blank, so that the first waveguide 1 and/or the second waveguide 2 may be manufactured, and a process is simple. This facilitates large-scale production. In addition, alternatively, a metal material or a non-metal material is electroplated and a layer of metal covers a surface of either the metal material or the non-metal material, so that the first waveguide 1 and/or the second waveguide 2 may be manufactured. A middle part of the metal structure 20 is filled with air, or may be filled with another medium. The medium can support the metal structure 20 and maintain a shape of the metal structure 20.

In some other embodiments, the transformative apparatus 100 may not include the second waveguide 2. In this embodiment, a metal reflective surface (not shown in the figure) may be provided on a side that is of the planar transmission assembly 3 of the transformative apparatus 100 and that faces away from the first waveguide 1, and a short circuit is performed on the side that is of the planar transmission assembly 3 and that faces away from the first waveguide 1, so that the electrical signal is transmitted between the first waveguide 1 and the planar transmission assembly 3. An area of the metal reflection surface may be greater than an area of a hollow part in the first waveguide 1. The metal reflective surface may be an entire metal surface, or may include a metal surface with a gap, and a pattern formed by the gap enables the metal surface with the gap to reflect an electromagnetic wave.

Figure 3:
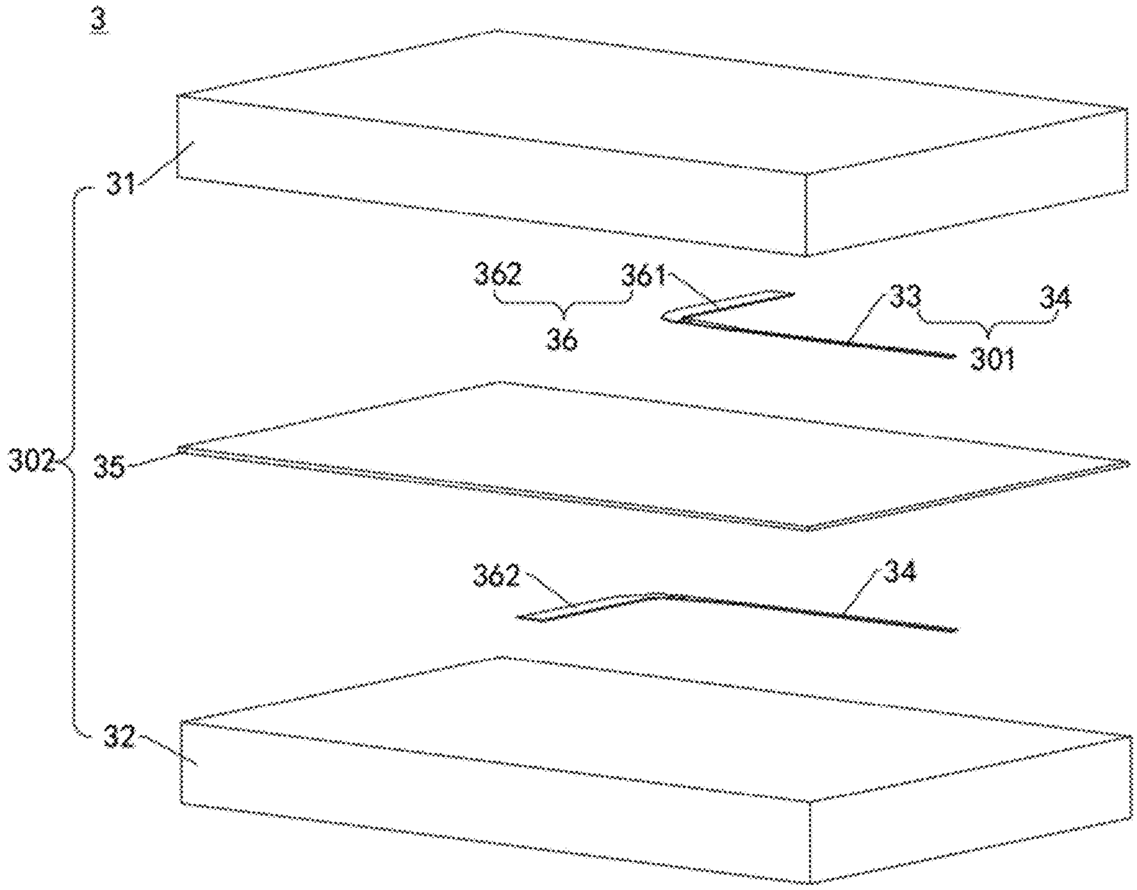
FIG. 3 is an exploded view of a structure of a planar transmission assembly shown in FIG. 2.

FIG. 3 is an exploded view of a structure of the planar transmission assembly 3 shown in FIG. 2.

For example, the planar transmission assembly 3 may include a transmission member 301 and a dielectric member 302. Shapes and quantities of transmission members 301 and dielectric members 302 are designed, to obtain different types of planar transmission assemblies 3. The transmission member 301 is configured to receive and transmit the electrical signal having the first mode, and the dielectric member 302 is configured to adjust an electrical property such as impedance of the planar transmission assembly 3, to adapt to different disclosure environments.

For example, as shown in FIG. 3, the planar transmission assembly 3 may include a planar parallel line structure. The dielectric member 302 of the planar transmission assembly 3 includes the first substrate 31 and the second substrate 32 that are spaced and disposed opposite to each other. The second substrate 32 is fastened to the first substrate 31. The transmission member 301 of the planar transmission assembly 3 includes a first strip 33 and a second strip 34 that are located between the first substrate 31 and the second substrate 32. The transmission member 301 is configured to receive and transmit the electrical signal having the first mode.

The first strip 33 is fastened to the first substrate 31, and the second strip 34 is fastened to the second substrate 32. The first substrate 31 and the second substrate 32 are configured to support and protect the first strip 33 and the second strip 34. An electrical signal is propagated on the first strip 33 and the second strip 34. The first substrate 31 and/or the second substrate 32 may be a high-frequency substrate. In this disclosure, the high-frequency substrate may be a substrate that can be used in an operating condition in which an operating frequency is higher than 1 GHz. The first strip 33 and the second strip 34 may be manufactured through a process such as printing, etching, or surface mounting. Costs are low and efficiency is high.

The planar transmission assembly 3 may further include an adjustable material layer 35 filled between the first substrate 31 and the second substrate 32. The adjustable material layer 35 is configured to regulate an output signal of the planar transmission assembly 3. Specifically, the electrical signal transmitted along the first strip 33 and the second strip 34 can excite the adjustable material layer 35, and the adjustable material layer 35 can present different electrical characteristics as the electrical signal changes. This affects a phase delay of the electrical signal by the planar transmission assembly 3, to adjust the electrical signal output by the planar transmission assembly 3.

For example, a converter antenna 36 may be of a dipole antenna structure. In this embodiment, the transmission member 301 of the planar transmission assembly 3 includes the first strip 33 and the second strip 34, and the converter antenna 36 is connected to the transmission member 301 of the planar transmission assembly 3.

Refer to FIG. 2 and FIG. 3. The planar transmission assembly 3 may further include a converter antenna 36. The converter antenna 36 is located between the first substrate 31 and the second substrate 32, and is connected to the transmission member 301. That is, the first waveguide 1 and the transmission member 301 and converter antenna 36 are respectively fastened on two sides of the first substrate 31, and the second substrate 32 is located on a side that is of the transmission member 301 and the converter antenna 36 and that faces away from the first substrate 31. The electrical signal can be transmitted along the transmission member 301 to the converter antenna 36 and output from the converter antenna 36. The converter antenna 36 is configured to receive an electrical signal from the transmission member 301, form local radiation, and excite the electrical signal having the second mode in the first waveguide 1.

For example, as shown in FIG. 3, the converter antenna 36 is located between the first substrate 31 and the second substrate 32, and is connected to the first strip 33 and the second strip 34. The converter antenna 36 may be of a dipole antenna structure. Specifically, the converter antenna 36 may include the first radiator 361 and the second radiator 362. The first radiator 361 and the second radiator 362 are respectively fastened to the first substrate 31 and the second substrate 32, and are respectively connected to the first strip 33 and the second strip 34. Both the converter antenna 36 and the parallel line structure of the planar transmission assembly 3 include two conductors, so that an electrical signal mode between the converter antenna 36 and the parallel line structure is easily converted. It may be understood that the converter antenna 36 may alternatively include another antenna structure that is configured to convert a mode of an electrical signal propagated on the first strip 33 and the second strip 34, for example, an array antenna including a single patch antenna, a multi-patch antenna, or a multi-stage guiding antenna, to implement transfer of the electrical signal between the planar transmission assembly 3 and the first waveguide 1. This is not limited in this disclosure.

In some embodiments, the second waveguide 2 may be located on the side that is of the transmission member 301 and the converter antenna 36 and that faces away from the first substrate 31, and the second waveguide 2 is fastened to the first substrate 31. In this embodiment, the dielectric member 302 of the planar transmission assembly 3 may not include the second substrate 32, and the second waveguide 2 may be directly fastened to the first substrate 31. In some other embodiments, the dielectric member 302 of the planar transmission assembly 3 may include the second substrate 32, and the second waveguide 2 may be fastened to the second substrate 32, to be indirectly fastened to the first substrate 31.

Figure 4:
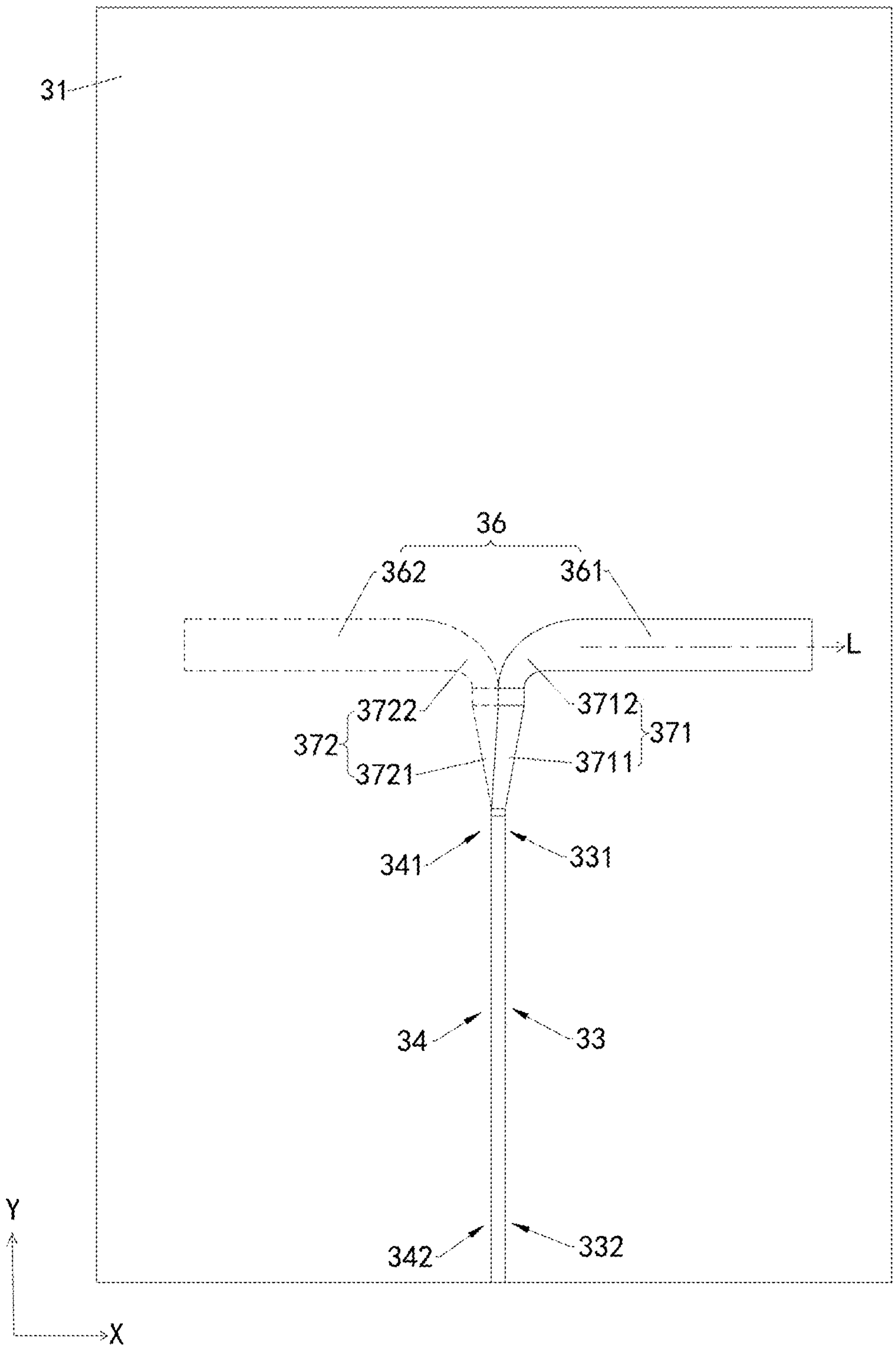
FIG. 4 is a diagram of a projection of a part of a structure shown in FIG. 3 onto a first plane.

Refer to FIG. 3 and FIG. 4. FIG. 4 is a diagram of a projection of a part of the structure shown in FIG. 3 onto the first plane XY. FIG. 4 shows projections of the first substrate 31, the first strip 33, the second strip 34, the first radiator 361, and the second radiator 362 onto the first plane XY. As shown in FIG. 4, the first plane XY is parallel to a surface that is of the first substrate 31 and that faces the first waveguide 1, and a dashed line region represents the projection of the second radiator 362.

For example, both the first strip 33 and the second strip 34 may be of a linear structure and disposed in parallel. In some other embodiments, the first strip 33 and/or the second strip 34 may alternatively be of a non-linear structure, for example, a sheet structure or an annular structure. This is not limited in this disclosure.

For example, a first end 331 of the first strip 33 and a first end 341 of the second strip 34 are located in a middle part of the second substrate 32, that is, located inside the planar transmission assembly 3. A second end 332 of the first strip 33 and a second end 342 of the second strip 34 extend from the inside of the planar transmission assembly 3 to an end surface of the planar transmission assembly 3, and are respectively connected to two poles of an external signal source. The external signal source (not shown in the figure) can emit an electrical signal, and the electrical signal emitted by the external signal source can be transmitted along the first strip 33 and the second strip 34.

For example, the first strip 33 and the second strip 34 may be in a straight line shape, or may be in an irregular linear shape such as a curve shape, a fold line shape, or a serpentine line shape. An extension direction of the first strip 33 may be parallel to the second direction Y.

For example, projections of the first strip 33 and the second strip 34 onto the first plane XY overlap. The first radiator 361 is connected to the first end 331 of the first strip 33, and the second radiator 362 is connected to the first end 341 of the second strip 34. The first radiator 361 and the second radiator 362 respectively extend from the first end 331 of the first strip 33 and the first end 341 of the second strip 34 in opposite directions, that is, an extension direction of the first radiator 361 is parallel to an extension direction of the second radiator 362, and the extension directions of the first radiator 361 and the second radiator 362 are opposite. The extension direction of the first radiator 361 is defined as a fourth direction L, and an extension direction of the converter antenna 36 is parallel to the extension direction of the first radiator 361 and/or the extension direction of the second radiator 362, that is, the extension direction of the converter antenna 36 is parallel to the fourth direction L.

For example, an end part of the first radiator 361 of the converter antenna 36 may be bent, that is, an end part that is of the first radiator 361 and that is away from the first strip 33 may be bent or curly relative to the first end. This is not limited in this disclosure.

For example, shapes of the first radiator 361 and the second radiator 362 may be the same or may be different. In some embodiments, both the first radiator 361 and the second radiator 362 may be of a straight line structure, and sizes of the first radiator 361 and the second radiator 362 in the second direction Y may be the same or may be different. In some other embodiments, the first radiator 361 and/or the second radiator 362 may be a non-straight-line structure, for example, a curve structure, a broken line structure, or a serpentine structure. This is not limited in this disclosure, provided that it is ensured that the extension directions of the first radiator 361 and the second radiator 362 are opposite.

For example, the planar transmission assembly 3 may further include a first transition structure 371 and a second transition structure 372. The first transition structure 371 is connected between the first strip 33 and the first radiator 361, and the second transition structure 372 is connected between the second strip and the second radiator 362. A first part 3711 that is of the first transition structure 371 and that is close to the first strip 33 may be inclined relative to the second direction Y, and a second part 3712 that is close to the first radiator 361 may have a specific radian, so that smooth transition can be performed between the converter antenna 36 and the parallel line structure. This avoids a rectangular structure and charge accumulation. A first part 3721 that is of the second transition structure 372 and that is close to the second strip 34 may be inclined relative to the second direction Y, and an inclination direction of the first part 3711 of the first transition structure 371 and an inclination direction of the first part of the second transition structure 372 relative to the second direction Y are opposite. The second part that is of the second transition structure 372 and that is close to the second radiator 352 may also have a specific radian.

In this embodiment, because the projections of the first strip 33 and the second strip 34 onto the first plane XY overlap, the first radiator 361 and the second radiator 362 can be separated in opposite directions relative to the first strip 33 (or the second strip 34) by using a structure design in which the inclination directions of the first transition structure 371 and the second transition structure 372 are opposite, so that the first radiator 361 and the second radiator 362 are spaced to form a dipole antenna structure.

Figure 5:
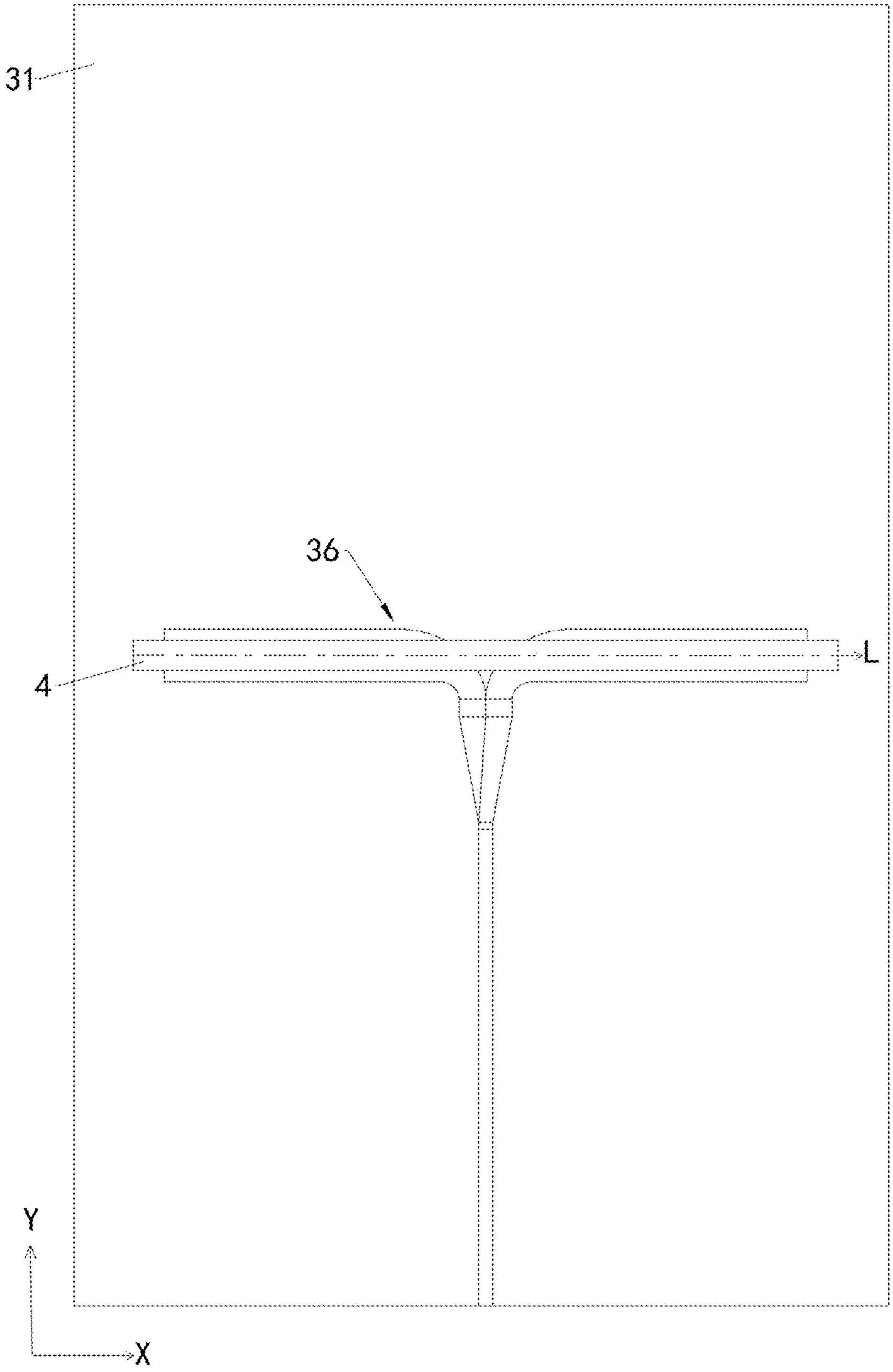
FIG. 5 is a diagram of a projection of a part of a structure shown in FIG. 2 onto a first plane.

FIG. 5 is a diagram of a projection of a part of the structure shown in FIG. 2 onto the first plane XY. FIG. 5 shows projections of the first substrate 31, the first guiding member 4, the first strip 33, the second strip 34, and the converter antenna 36 onto the first plane XY, and a dashed line represents the projection of the second radiator 362.

For example, both extension directions of the first radiator 361 and the second radiator 362 are parallel to the first direction X, that is, the fourth direction Lis parallel to the first direction X.

For example, the first guiding member 4 may be of a linear structure, and the extension direction of the converter antenna 36 is parallel to the extension direction of the first guiding member 4, so that the converter antenna 36 can receive the electrical signal from the transmission member 301, form local radiation, and excite the electrical signal having the second mode in the first waveguide 1.

In addition, a size of the first guiding member 4 in the first direction X may be larger than a size of the converter antenna 36 in the first direction X, or may be smaller than a size of the converter antenna 36 in the first direction X. A maximum size of the first guiding member 4 in the second direction Y may be smaller than a maximum size of the converter antenna 36 in the second direction Y, or may be larger than a maximum size of the converter antenna 36 in the second direction Y. This is not limited in this disclosure. In this disclosure, a distance between two points that are of any structure and that are farthest from each other in the second direction Y is defined as a maximum size of the structure in the second direction Y. Any structure may include the first guiding member 4, the converter antenna 36, and the like.

In this embodiment, the fourth direction Lis parallel to the first direction X, that is, an included angle between the fourth direction L and the first direction X is 0 degrees. In some other embodiments, the included angle between the fourth direction L and the first direction X may alternatively have a slight deviation relative to 0 degrees, for example, 3 degrees or 5 degrees. It may also be considered that the fourth direction L is parallel to the first direction X. This is not limited in this disclosure.

In some embodiments, a shape of the first guiding member 4 may be in a straight line shape, or may be in an irregular linear shape such as a curve shape, a fold line shape, or a serpentine line shape, provided that the extension direction of the first guiding member 4 is parallel to the extension direction of the converter antenna 36.

For example, a region of projections of the first radiator 361 and the second radiator 362 onto the first plane XY is a second projection region, and at least a part of the first guiding member 4 falls into the second projection region, so that the first radiator 361 and the second radiator 362 can excite an induced current on the first guiding member 4 in a coupled transmission manner. It may be understood that a region of a projection of a structure onto the first plane XY is a region enclosed by an outer contour of the projection of the structure, for example, the first radiator 361, the second radiator 362, the first guiding member 4, and the first substrate 31.

Figure 6:
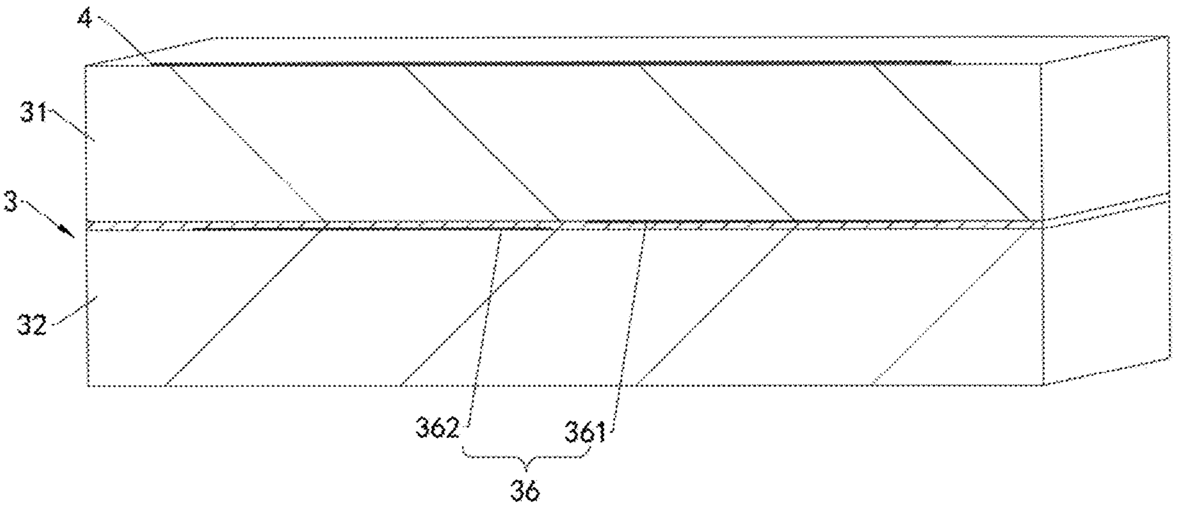
FIG. 6 is a diagram of an internal structure of a part of a structure shown in FIG. 2.

FIG. 6 is a diagram of an internal structure of a part of the structure shown in FIG. 2. FIG. 6 shows internal structures of the first guiding member 4 and the planar transmission assembly 3.

The first radiator 361 and the second radiator 362 are respectively fastened to the first substrate 31 and the second substrate 32. That is, the converter antenna 36 is located between the first substrate 31 and the second substrate 32. For example, the first guiding member 4 is located on a side that is of the first substrate 31 and that faces away from the converter antenna 36. The first guiding member 4 and the converter antenna 36 are separated by the first substrate 31, and energy is transmitted between the first guiding member 4 and the converter antenna 36 in a coupling manner.

Refer to FIG. 5 and FIG. 6. For example, the first guiding member 4 may be located right above the converter antenna 36, to improve coupling efficiency. For example, the first guiding member 4, the first radiator 361, and the second radiator 362 are all of a bar-like structure, and a middle line of the first guiding member 4 coincides with a middle line of the first radiator 361 and/or a middle line of the second radiator 362, that is, a connection line between midpoints of two ends of the projection of the first guiding member 4 coincides with a connection line between midpoints of two ends of the projection of the converter antenna 36. In some other embodiments, the first guiding member 4 may alternatively slightly deviate from the top of the converter antenna 36. That is, a spacing may exist between the connection line between midpoints of two ends of the projection of the first guiding member 4 and the connection line between midpoints of two ends of the projection of the converter antenna 36. It may also be considered that the first guiding member 4 may be located right above the converter antenna 36. This is not limited in this disclosure.

Figure 7:
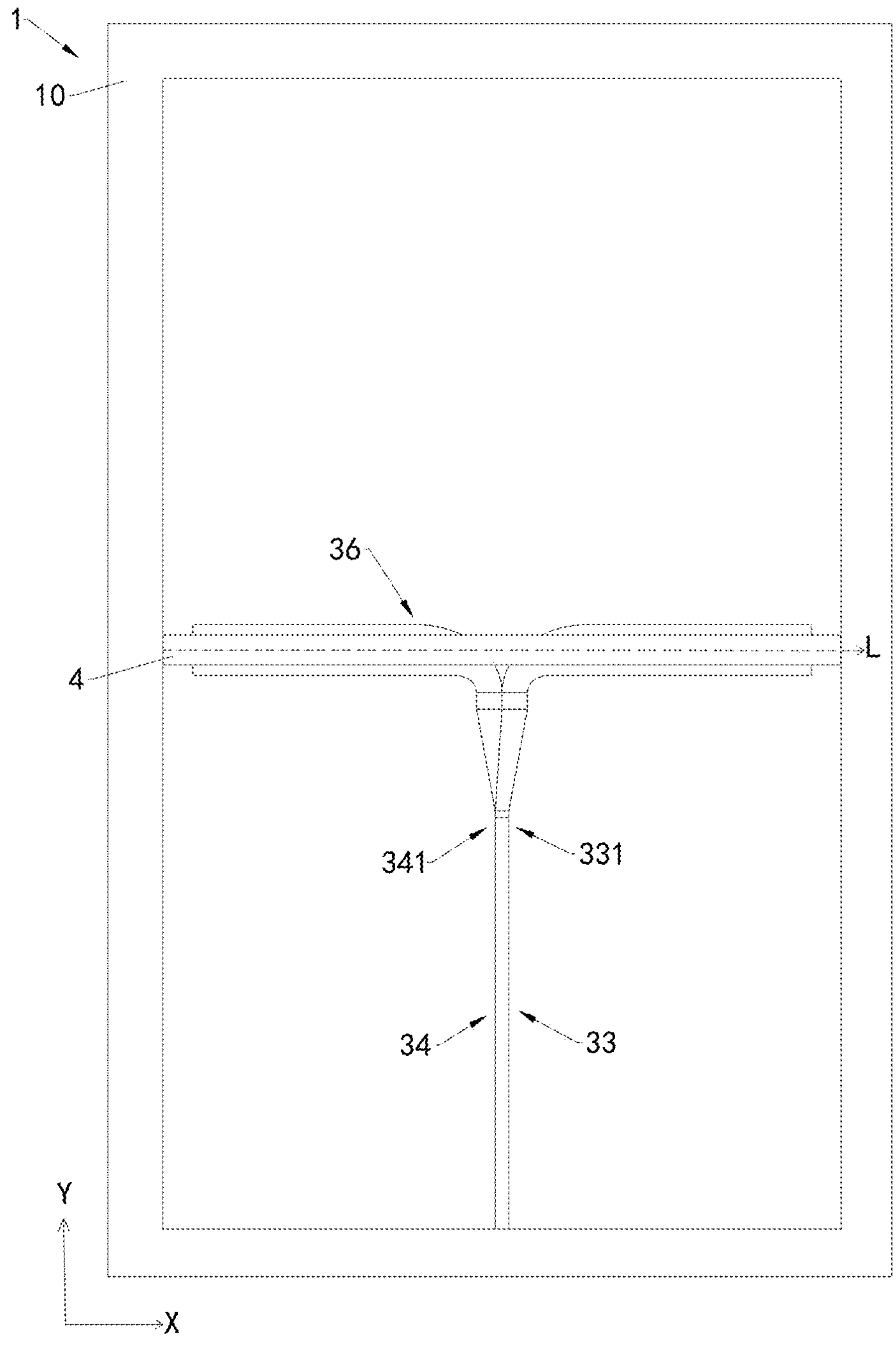
FIG. 7 is a diagram of a projection of the transformative apparatus shown in FIG. 1 onto a first plane.
Figure 8:
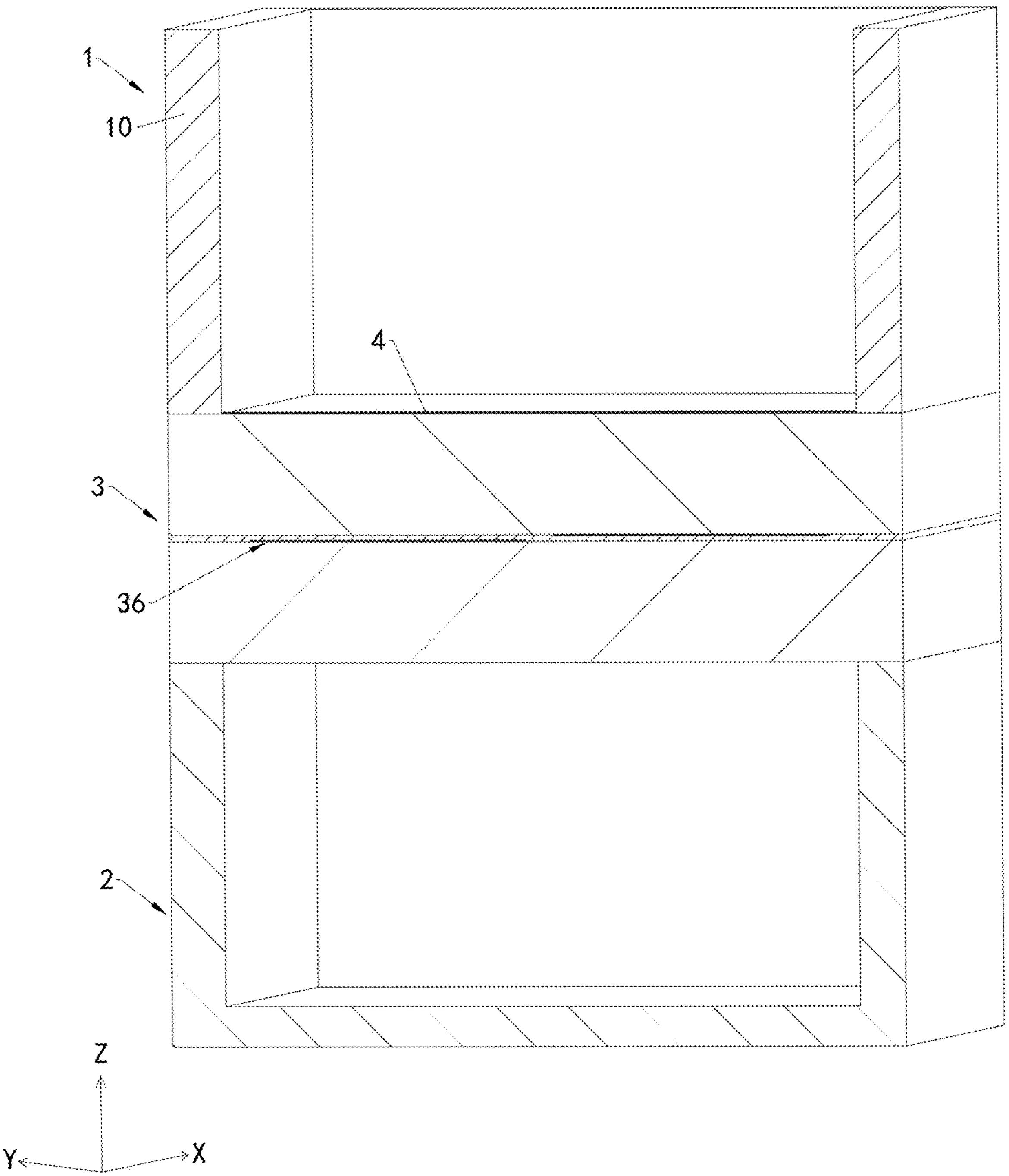
FIG. 8 is a diagram of an internal structure of the transformative apparatus shown in FIG. 1.

FIG. 7 is a diagram of a projection of the transformative apparatus 100 shown in FIG. 1 onto the first plane XY. FIG. 8 is a diagram of an internal structure of the transformative apparatus 100 shown in FIG. 1.

For example, a region of a projection of the first waveguide 1 onto the first plane XY is a first projection region. At least a part of the first guiding member 4, or at least a part of the first guiding member 4 and at least a part of the converter antenna 36 fall into the first projection region, to restrict the electrical signal inside the first waveguide 1. This reduces a leakage of the electrical signal in a transfer process and improves transfer efficiency. This is not limited in this disclosure.

In some other embodiments, the first end 331 of the first strip 33, the first end 341 of the second strip 34, the converter antenna 36, and the first guiding member 4 fall into the first projection region, to restrict the electrical signal inside the first waveguide 1. This further reduces a leakage of the electrical signal in a transfer process and improves transfer efficiency.

In some embodiments, the first guiding member 4 may be connected to the hollow metal structure 10 of the first waveguide 1, so that the induced current on the first guiding member 4 can be directly transmitted to the first waveguide 1. This reduces a loss and improves transmission efficiency. For example, two ends of the first guiding member 4 may be connected to the hollow metal structure 10 of the first waveguide 1. In addition, one end of the two ends of the first guiding member 4 may be connected to the hollow metal structure 10 of the first waveguide 1.

In some other embodiments, the first guiding member 4 may alternatively be located inside the hollow metal structure 10 of the first waveguide 1, that is, the first guiding member 4 is not in contact with the hollow metal structure 10 of the first waveguide 1. In this case, the induced current on the first guiding member 4 is transferred to the first waveguide 1 in an indirect coupling manner.

For example, the extension direction of the first guiding member 4 is parallel to a polarization direction of the first mode corresponding to the first waveguide 1, that is, the extension direction of the first guiding member 4 is parallel to the first direction X. It may be understood that a polarization direction of a mode of an induced current excited on the first guiding member 4 is parallel to the extension direction of the first guiding member 4. That is, the polarization direction of the mode of the induced current is parallel to the first direction X. That is, the mode of the induced current excited on the first guiding member 4 is the first mode. In this way, the mode of the induced current matches the first waveguide 1, and the induced current can be transmitted in the first waveguide 1.

For example, the extension direction of the converter antenna 36 is parallel to the first direction X, and a polarization direction of a radiation field of the converter antenna 36 is parallel to the extension direction of the converter antenna 36. That is, the polarization direction of the radiation field of the converter antenna 36 is parallel to the first direction X. That is, a polarization direction of a radiation field of an electrical signal transmitted on the converter antenna 36 is parallel to the polarization direction of the first mode. That is, a mode of the electrical signal transmitted on the converter antenna 36 is the first mode. In addition, the extension direction of the converter antenna 36 is parallel to the extension direction of the first guiding member 4, so that an induced current in the first mode can be excited on the first guiding member 4.

In this disclosure, a first electrical signal emitted by an external communication device is transmitted on the first strip 33 and the second strip 34. When the first electrical signal is transmitted from the first strip 33 and the second strip 34 to the converter antenna 36, a mode of the first electrical signal changes, the first electrical signal changes to a second electrical signal, and a mode of the second electrical signal is the first mode. The second electrical signal on the converter antenna 36 excites an induced current in the first mode on a guiding metal. The induced current is transmitted in the first waveguide 1 in a direct transmission manner or in an indirect coupled excitation manner.

Refer to FIG. 3. The transformative apparatus 100 receives the electrical signal from the transmission member 301 by using the converter antenna 36, and guides the electrical signal to the first waveguide 1 by using the first guiding member 4. This reduces a leakage of the electrical signal in a transfer process from the transmission member 301 to the first waveguide 1, and improves transfer efficiency of the electrical signal between different types of transmission lines, so that the electrical signal can be stably and efficiently transmitted. In this embodiment, the converter antenna 36 and the first guiding member 4 jointly implement efficient transfer of an electrical signal between the transmission member 301 and the first waveguide 1.

For example, two ends of the first guiding member 4 may be respectively connected to midpoints of two long edges of the first waveguide 1. A mode of an electrical signal in the first waveguide 1, that is, a strength distribution rule of an electromagnetic field, is decreasing from a middle part of the long edge to two ends. The first guiding member 4 is disposed in a middle part of the first waveguide 1, that is, the first guiding member 4 is disposed in a region with the highest electromagnetic field strength, so that efficiency of transmitting the electrical signal on the first guiding member 4 to the first waveguide 1 can be improved. In some other embodiments, the first guiding member 4 may alternatively deviate from the middle part of the long edge of the first waveguide 1. That is, the first guiding member 4 may be disposed between the middle part of the long edge and an end part of the long edge of the first waveguide 1. This is not limited in this disclosure.

For example, the first guiding member 4 may be of a metal patch structure, and is fastened between the first waveguide 1 and the first substrate 31, to be connected to the first waveguide 1. The first guiding member 4 may be connected to an end part of the first waveguide 1 through welding, to improve connection reliability. The first guiding member 4 may alternatively be manufactured, in a manner of printing, etching, surface mounting, or the like, on a surface that is of the first substrate 31 and that faces the first waveguide 1. When the first waveguide 1 is fastened to the planar transmission assembly 3, the first guiding member 4 is in contact with the first waveguide 1, to be connected to the first waveguide 1.

In this embodiment, the first waveguide 1 and the first guiding member 4 may be assembled into a first module, the planar transmission assembly 3 is considered as a second module, and the second waveguide 2 is considered as a third module. The first module, the second module, and the third module may be separately manufactured at the same time, and the first module, the second module, and the third module are assembled. This improves efficiency and reduces costs. In addition, composition of the first module, the second module, and the third module is clear, and a separate assembly process is simple. Alternatively, in some other embodiments, the first waveguide 1 may be considered as the first module, and the planar transmission assembly 3 may be considered as the second module. In this embodiment, the planar transmission assembly 3 may include the first guiding member 4. This is not limited in this disclosure.

For example, the first module, the second module, and the third module may be automatically aligned, fastened, and installed by using an industrial technology, so that the first module, the second module, and the third module can be accurately aligned, to reduce assembly costs of the transformative apparatus 100, reduce a processing error, and improve a yield rate.

For example, the first module, the second module, and the third module may be connected to each other by using a fastener, be welded, be locked by using a screw, be locked by using a clamp, or be connected by using a spline, to facilitate disassembly of and exchange between modules.

For example, a manner of fastening between the first waveguide 1 and the planar transmission assembly 3 is the same as a manner of fastening between the planar transmission assembly 3 and the second waveguide 2.

Therefore, the transformative apparatus 100 is highly modularized and integrated. This can reduce a space occupation rate of the transformative apparatus 100 in a communication device and disassembly and maintenance costs, and facilitate large-scale production of the transformative apparatus 100.

In some embodiments, the transformative apparatus 100 may not include the first guiding member 4. In this embodiment, a first electrical signal emitted by an external communication device is transmitted on the first strip 33 and the second strip 34. When the first electrical signal is transmitted from the first strip 33 and the second strip 34 to the converter antenna 36, the first electrical signal changes to a second electrical signal in the first mode. The second electrical signal is coupled to the first waveguide 1 to excite an induced current in a coupled transmission manner, so that the second electrical signal is transmitted along the first waveguide 1 in a coupled excitation manner. In this embodiment, the converter antenna 36 implements transfer of an electrical signal between the planar transmission assembly 3 and the first waveguide 1.

Refer to FIG. 1, FIG. 7, and FIG. 8. For example, the first waveguide 1 or the first waveguide 1 and the second waveguide 2 may fall into a range of a region of a projection of the first substrate 31 onto the first plane XY, so that the planar transmission assembly 3 can completely separate the first waveguide 1 and the second waveguide 2 into two independent parts. This facilitates separate manufacturing of the first waveguide 1 and the second waveguide 2 during manufacturing of a large-scale array, and improves efficiency.

For example, a shape of a cross section of the second waveguide 2 may be the same as a shape of a cross section of the first waveguide 1. For example, both the cross section of the second waveguide 2 and the cross section of the first waveguide 1 are rectangular. In this case, a mode of an electrical signal transmitted in the second waveguide 2 is the same as a mode of an electrical signal transmitted in the first waveguide 1. In this disclosure, the cross section of the first waveguide 1 is a region enclosed by an outer contour that is of the first waveguide 1 and that is parallel to the first plane XY, and the cross section of the second waveguide 2 is a region enclosed by an outer contour that is of the second waveguide 2 and that is parallel to the first plane XY.

In some other embodiments, the shape of the cross section of the second waveguide 2 may be different from the shape of the cross section of the first waveguide 1. For example, the cross section of the first waveguide 1 may be a rectangle, and the cross section of the second waveguide 2 may be a circle. In this case, the second mode of the electrical signal transmitted in the first waveguide 1 may be a $TE_{10}$ mode. The cross section of the first waveguide 1 and the cross section of the second waveguide 2 may alternatively be in another shape. This is not limited in this disclosure.

For example, the transformative apparatus 100 may further include a second guiding member (not shown in the figure), and the second guiding member may be located between the second substrate 32 and the second waveguide 2. In this embodiment, the mode of the electrical signal transmitted in the second waveguide 2 is the same as the mode of the electrical signal transmitted in the first waveguide 1, that is, the electrical signal transmitted in the second waveguide 2 may have the second mode. Correspondingly, an extension direction of the second guiding member is parallel to the first direction X, and the second guiding member is configured to guide the electrical signal output from the converter antenna 36 into the second waveguide 2. It may be understood that in some other embodiments, the electrical signal transmitted in the second waveguide 2 may alternatively have another mode different from the second mode.

For example, a size of the cross section of the second waveguide 2 may be completely the same as or may be slightly different from a size of the cross section of the first waveguide 1. This is not limited in this disclosure.

Figure 9:
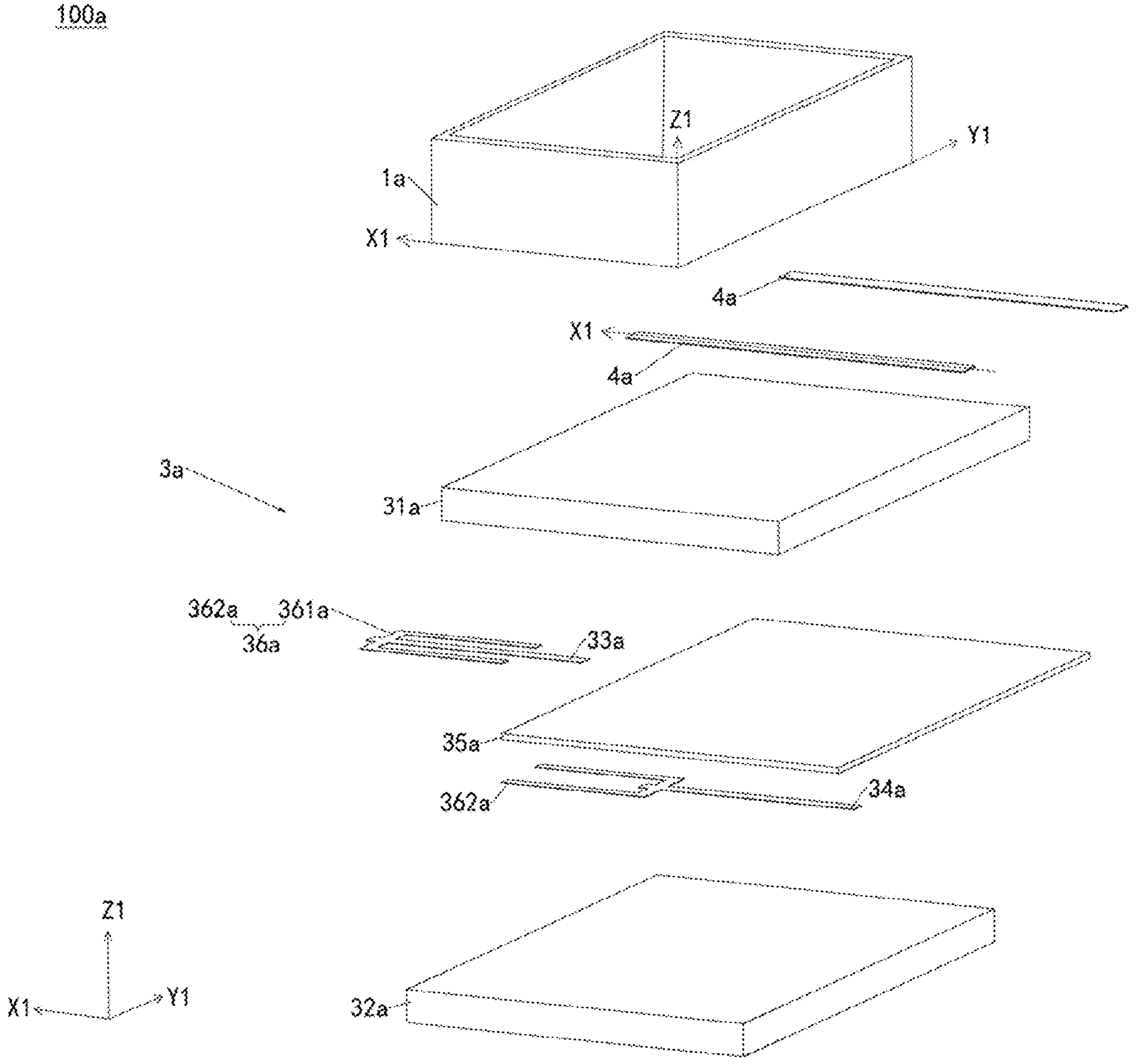
FIG. 9 is a diagram of a part of a structure of a transformative apparatus in some other embodiments according to this disclosure.

FIG. 9 is a diagram of a part of a structure of a transformative apparatus **100*a*** in some other embodiments according to this disclosure.

In this embodiment, the transformative apparatus **100*a* may include a first waveguide 1*a*, a second waveguide (not shown in the figure), and a planar transmission assembly 3*a*. The planar transmission assembly 3*a* includes a first substrate 31*a*, a second substrate 32*a*, a first strip 33*a*, a second strip 34*a*, an adjustable material layer 35*a*, and a converter antenna 36*a*. The transformative apparatus 100*a* may further include a first guiding member 4*a***.

In this embodiment, for a relative location relationship and a connection structure between the first waveguide **1*a*, the second waveguide, the first guiding member 4*a*, the first substrate 31*a*, the second substrate 32*a*, the first strip 33*a*, the second strip 34*a*, the adjustable material layer 35*a*, and the converter antenna 36*a*, refer to corresponding components in the transformative apparatus 100 shown in FIG. 3. A difference between this embodiment and the transformative apparatus 100 shown in FIG. 3 lies in that a structure of the converter antenna 36*a* is different from a structure of the converter antenna 36 shown in FIG. 3. Only the structure of the converter antenna 36*a* in this embodiment and a manner of connecting the converter antenna 36*a* to the first strip 33*a* and the second strip 34*a*** are described herein. It should be understood that in this embodiment of this disclosure, when a component is designed with reference to another component, structures of the two components may be completely the same, or core structures of the two components may be the same, but a few structures may be different. This is not strictly limited in this disclosure.

The first waveguide **1*a* may be of a rectangular hollow metal structure for receiving and transmitting an electrical signal having a $TE_{10}$ mode. A direction of a short edge of the first waveguide 1*a* is parallel to a polarization direction of the $TE_{10}$ mode, that is, the direction of the short edge of the first waveguide 1***a* is parallel to a first direction X1. In this disclosure, a direction of a long edge of the first waveguide 1*a* is defined as a second direction Y1, a plane parallel to the first direction X1 and the second direction Y1 is defined as a second plane X1Y1, and a direction perpendicular to the second plane X1Y1 is defined as a third direction Z1.

In some other embodiments, the first waveguide 1*a* may alternatively be of a square tubular structure, a circular tubular structure, or an elliptical tubular structure. An example in which the first waveguide 1*a* is of the circular tubular structure is used, and a cross section of the circular tubular structure is a concentric circle. In this embodiment, the second mode may alternatively be a $TE_{11}$ mode, and a polarization direction of the $TE_{11}$ mode passes through a center of the cross section of the circular tubular structure, that is, the first direction X1 is parallel to a direction of the center of the cross section of the circular tubular structure.

Figure 10:
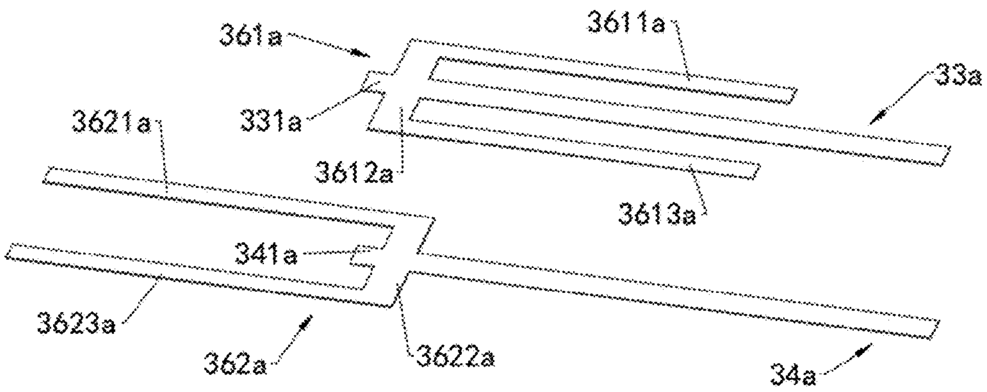
FIG. 10 is a diagram of structures of a first strip, a second strip, and a converter antenna shown in FIG. 9.
Figure 11:
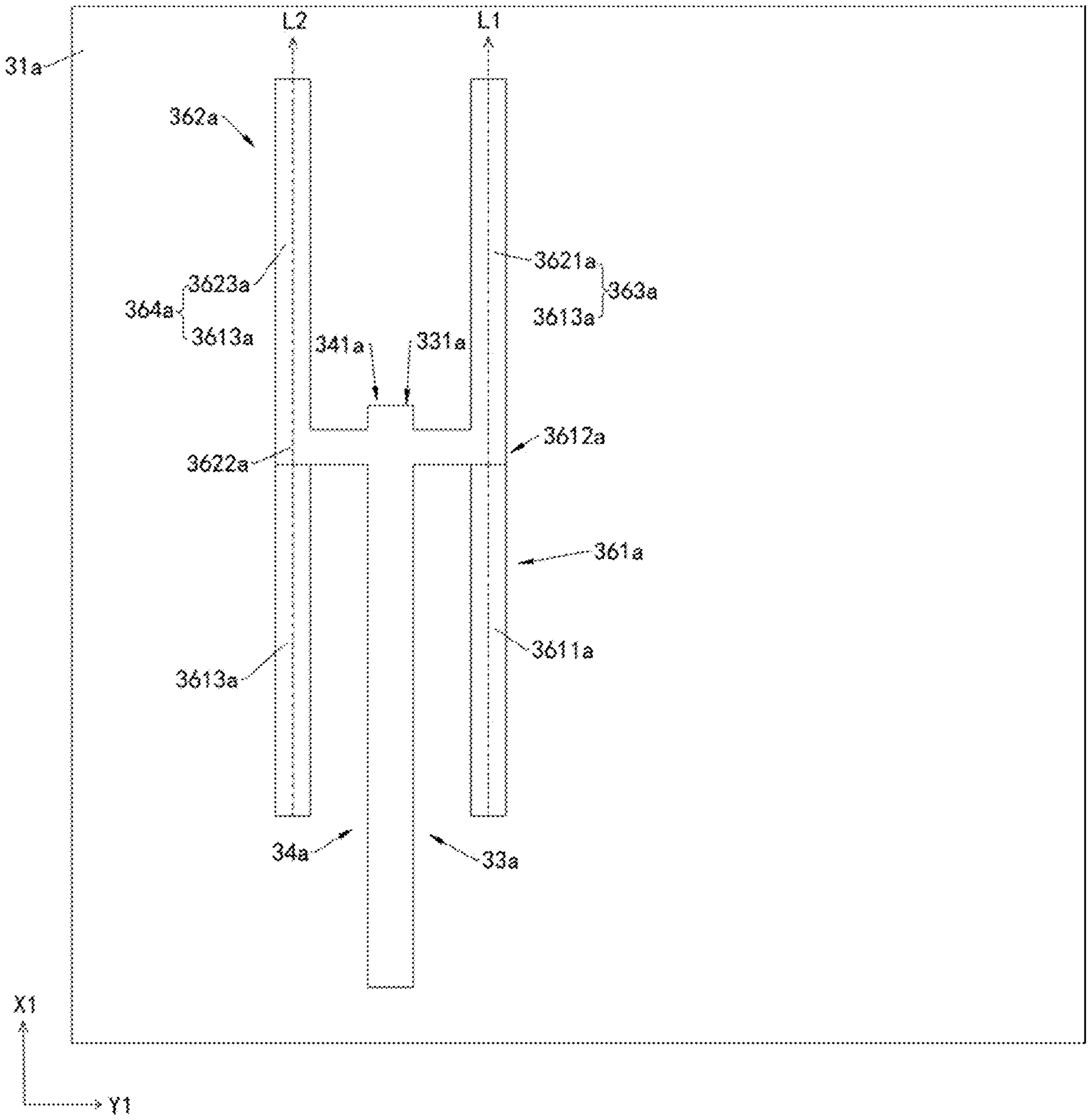
FIG. 11 is a diagram of projections of the structures shown in FIG. 10 onto a second plane.

Refer to FIG. 9, FIG. 10, and FIG. 11. FIG. 10 is a diagram of structures of the first strip 33*a*, the second strip 34*a*, and the converter antenna 36*a* shown in FIG. 9. FIG. 11 is a diagram of projections of the structures shown in FIG. 10 onto the second plane X1Y1. The second plane X1Y1 is parallel to a surface that is of the first substrate 31*a* and that faces the first waveguide 1*a*.

For example, the converter antenna 36*a* may be of a dual-dipole structure. Specifically, the converter antenna 36*a* may include a first radiator 361*a* and a second radiator 362*a*. The first radiator 361*a* and the second radiator 362*a* are respectively connected to a first end 331*a* of the first strip 33*a* and a first end 341*a* of the second strip 34*a*.

The first radiator 361*a* may include a first portion 3611*a*, a second portion 3612*a*, and a third portion 3613*a* that are sequentially connected, the first portion 3611*a*, the second portion 3612*a*, and the third portion 3613*a* form a U shape, the second radiator 362*a* may also include a first portion 3621*a*, a second portion 3622*a*, and a third portion 3623*a* that are sequentially connected, the first portion 3621*a*, the second portion 3622*a*, and the third portion 3623*a* form an inverse U shape, the first radiator 361*a* and the second radiator 362*a* are symmetrically disposed, and openings of the first radiator 361*a* and the second radiator 362*a* face opposite directions. A middle part of the second portion 3612*a* of the first radiator 361*a* is fastened to the first end 331*a* of the first strip 33*a*, and the first radiator 361*a* is symmetrically distributed relative to an extension direction of the first strip 33*a*. A middle part of the second portion 3622*a* of the second radiator 362*a* is fastened to the first end 341*a* of the second strip 34*a*, and the second radiator 362*a* is symmetrically distributed relative to an extension direction of the second strip 34*a*.

Projections of the second portion 3612*a* of the first radiator 361*a* and the second portion 3622*a* of the second radiator 362*a* onto the second plane X1Y1 overlap, an extension direction of the first portion 3611*a* of the first radiator 361*a* is the same as an extension direction of the first portion 3621*a* of the second radiator 362*a*, and an extension direction of the third portion 3613*a* of the first radiator 361*a* is the same as an extension direction of the third portion 3623*a* of the second radiator 362*a*. The extension directions of the first portion 3611*a* of the first radiator 361*a* and the first portion 3621*a* of the second radiator 362*a* are both parallel to the first direction X1, and the extension directions of the third portion 3613*a* of the first radiator 361*a* and the third portion 3623*a* of the second radiator 362*a* are both parallel to the first direction X1.

The first radiator 361*a* and the second radiator 362*a* form a dual converter antenna 36*a* structure, and the first portion 3611*a* of the first radiator 361*a* and the first portion 3621*a* of the second radiator 362*a* form a first converter antenna 363*a*. In FIG. 11, an extension direction of the first converter antenna 363*a* is defined as a fifth direction L1, and the extension direction of the first converter antenna 363*a* is parallel to the first direction X1. The third portion 3613*a* of the first radiator 361*a* and the third portion 3623*a* of the second radiator 362*a* form a second converter antenna 364*a*. In FIG. 11, an extension direction of the second converter antenna 364*a* is defined as a sixth direction L2, and the extension direction of the second converter antenna 364*a* is parallel to the first direction X1.

Correspondingly, there may be two first guiding members 4*a*, and the two first guiding members 4*a* may be respectively disposed corresponding to the first converter antenna 363*a* and the second converter antenna 364*a*. In some other embodiments, there may alternatively be one first guiding member 4*a*. The first guiding member 4*a* may be disposed between the first converter antenna 363*a* and the second converter antenna 364*a*, or may be disposed close to the first converter antenna 363*a* or the second converter antenna 364*a*. This is not limited in this disclosure, provided that an extension direction of the first guiding member 4*a* is parallel to the first direction X1.

In this embodiment, the converter antenna 36*a* is of a dual-dipole structure, so that an input direction of an electrical signal of the planar transmission assembly 3*a* can be changed. Specifically, as shown in FIG. 4, when the converter antenna 36 is of a structure shown in FIG. 4, the extension directions of the first strip 33 and the second strip 34 of the planar transmission assembly 3 may be both perpendicular to the extension direction of the converter antenna 36, that is, parallel to the second direction Y or the third direction Z (not shown in the figure, and an adaptive design may be performed with reference to FIG. 4). In this way, input ends of the first strip 33 and the second strip 34 may extend to an end surface that is of the planar transmission assembly 3 and that is perpendicular to the second direction Y, or extend to an end surface that is of the planar transmission assembly 3 and that is perpendicular to the third direction Z, and are connected to an external communication device. As shown in FIG. 11, when the converter antenna 36*a* is of the dual-dipole structure shown in FIG. 11, the extension directions of the first strip 33*a* and the second strip 34*a* of the planar transmission assembly 3*a* may be parallel to the extension direction of the converter antenna 36*a*, that is, parallel to the first direction X1, and input ends of the first strip 33*a* and the second strip 34*a* may extend to an end surface that is of the planar transmission assembly 3*a* and that is perpendicular to the first direction X1, and are connected to an external communication device. Therefore, a structure of the converter antenna 36 may be designed based on an arrangement location of the transformative apparatus 100, to facilitate transmission of an electrical signal to an external communication device.

Figure 12A:
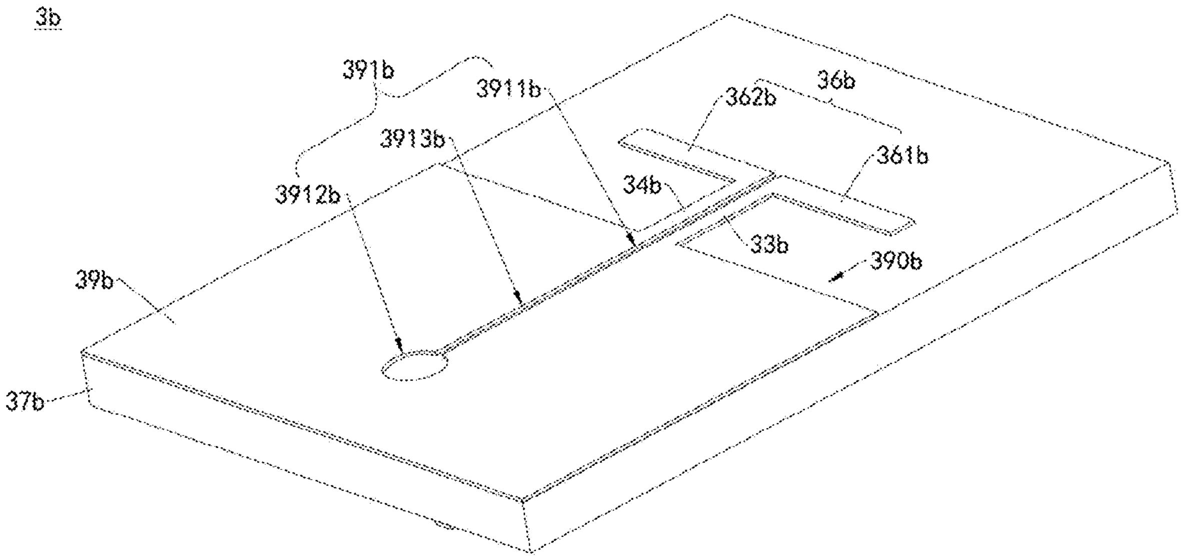
FIG. 12A is a diagram of a structure of a planar transmission assembly in some other embodiments according to this disclosure.
Figure 12B:
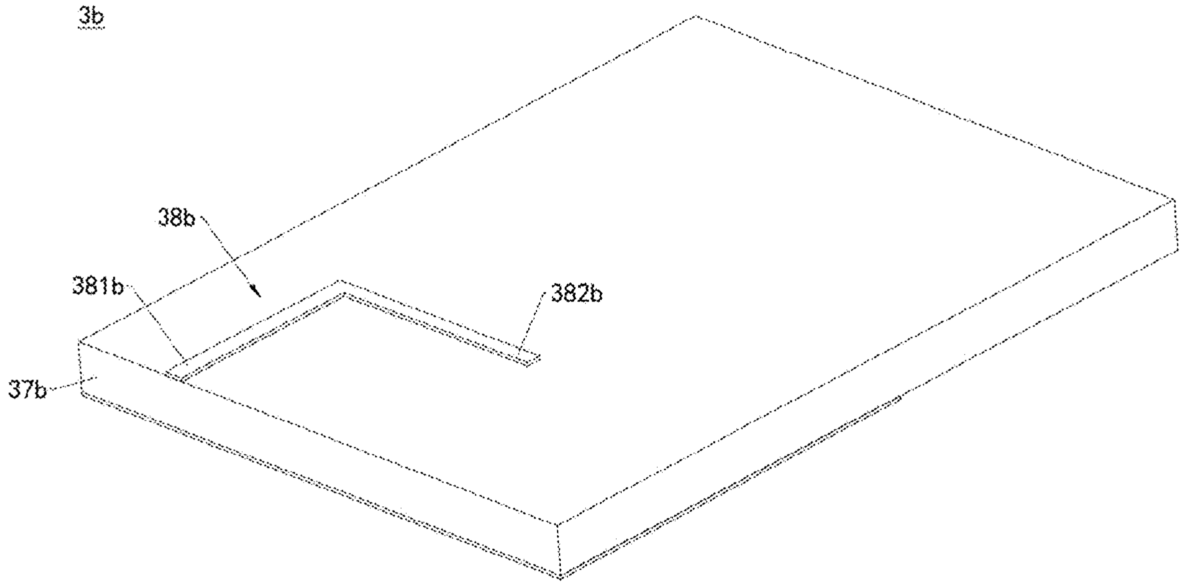
FIG. 12B is a diagram of the structure of the planar transmission assembly shown in FIG. 12A from another perspective.
Figure 13:
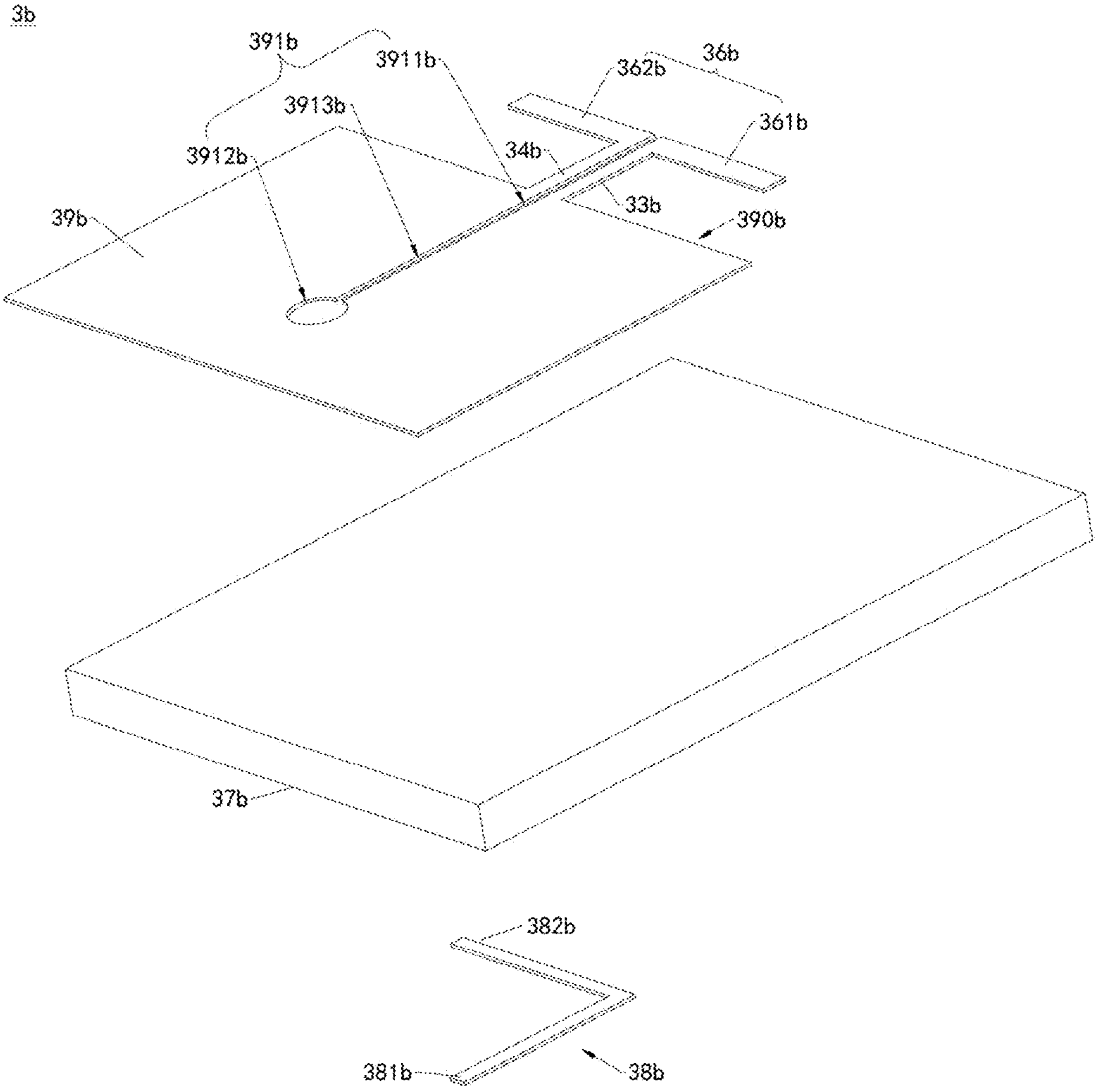
FIG. 13 is an exploded view of the structure of the planar transmission assembly shown in FIG. 12A.

FIG. 12A is a diagram of a structure of a planar transmission assembly 3*b* in some other embodiments according to this disclosure. FIG. 12B is a diagram of the structure of the planar transmission assembly 3*b* shown in FIG. 12A from another perspective. FIG. 13 is an exploded view of the structure of the planar transmission assembly 3*b* shown in FIG. 12A. A viewing angle shown in FIG. 12B is flipped relative to a viewing angle shown in FIG. 12A.

For example, the planar transmission assembly 3 in the transformative apparatus 100 shown in FIG. 2 and FIG. 3 may alternatively be of another structure such as a microstrip. Due to a limitation of structures of different planar transmission assemblies 3, a structure other than the planar parallel line structure cannot be directly connected to the converter antenna 36, and needs to be indirectly connected to the converter antenna 36 by using the planar parallel line structure. As shown in FIG. 12A, an example in which the planar transmission assembly 3*b* is a microstrip is used for specific description in this disclosure.

For example, the planar transmission assembly 3*b* may usually be a microstrip. Specifically, the planar transmission assembly 3*b* may include a dielectric substrate 37*b* and a strip 38*b* fastened to the dielectric substrate 37*b*. A metal layer 39*b* is coated on a side that is of the dielectric substrate 37*b* and that faces away from the strip 38*b*. The converter antenna 36*b* and the metal layer 39*b* are disposed on a same side of the dielectric substrate 37*b*. A first end 381*b* of the strip 38*b* is located at an end part of the dielectric substrate 37*b*, to be connected to an external communication device. A second end 382*b* that is of the strip 38*b* and that is opposite to the first end 381*b* extends to a middle part of the dielectric substrate 37*b*. An electrical signal emitted by the external communication device can be transmitted along the strip 38*b*.

For example, the strip 38*b* may be of a linear structure such as a straight line structure, a curve structure, a fold line structure, or a serpentine line structure. A thickness and a width of the strip 38*b* and a material and a thickness of the dielectric substrate 37*b* are adjusted, so that characteristic impedance of the microstrip can be controlled. For example, a size of a cross section area of the strip 38*b* may be increased, to reduce a loss of an electrical signal and improve an antenna gain. It may be understood that the cross section area of the strip 38*b* is an area that is of the strip 38*b* and that is in a direction perpendicular to an extension direction of the strip 38*b*.

The metal layer 39*b* extends from the end part of the dielectric substrate 37*b* to the middle part of the dielectric substrate 37*b*. A connection end 390*b* that is of the metal layer 39*b* and that is close to the second end 382*b* of the strip 38*b* is deformed into a parallel line structure, to adapt to the converter antenna 36*b*. The microstrip is connected to the converter antenna 36*b* by using the parallel line structure.

For example, a gap 391*b* may be disposed at the connection end 390*b* of the metal layer 39*b*. The gap 391*b* has a first end part 3911*b*, a second end part 3912*b*, and a mid part 3913*b* connected between the first end part 3911*b* and the second end part 3912*b*. The first end part 3911*b* of the gap 391*b* is located in a middle part of the metal layer, and the second end part 3912*b* of the gap 391*b* extends to an end surface of the connection end 390*b* of the metal layer 39*b*.

For example, the first end part 3911*b* may be enlarged relative to the mid part 3913*b*, that is, a size of the first end part 3911*b* is larger than a size of the mid part 3913*b*, to avoid charge accumulation at the first end part 3911*b*. For example, the first end part 3911*b* may be deformed into a circle, or may be deformed into a square, an ellipse, or another irregular shape.

For example, the planar transmission assembly 3*b* may include the converter antenna 36*b*, and the converter antenna 36*b* may include a first radiator 361*b* and a second radiator 362*b*. The planar transmission assembly 3*b* may further include a first strip 33*b* and a second strip 34*b* that are disposed in parallel and are spaced. The first strip 33*b* and the second strip 34*b* are both fastened to the connection end 390*b* of the metal layer 39*b*, and are respectively disposed on two sides of the gap 391*b*. The first strip 33*b* and the second strip 34*b* form a parallel line structure, and are configured to connect to the converter antenna 36*b*. The first radiator 361*b* and the second radiator 362*b* are respectively connected to the first strip 33*b* and the second strip 34*b*.

In this embodiment, for structures of the first radiator 361*b* and the second radiator 362*b* and a structure of connection to each of the first strip 33*b* and the second strip 34*b*, refer to embodiments shown in FIG. 3 and FIG. 4. Details are not described herein again. In addition, the converter antenna 36*b* may alternatively be of a dual-dipole structure. For details, refer to the structures of the converter antenna 36*b* shown in FIG. 10 and FIG. 11. Details are not described herein again.

In some embodiments, the first strip 33 and/or the second strip 34 of the planar transmission assembly 3 shown in FIG. 3 may alternatively be of another structure.

Figure 14A:
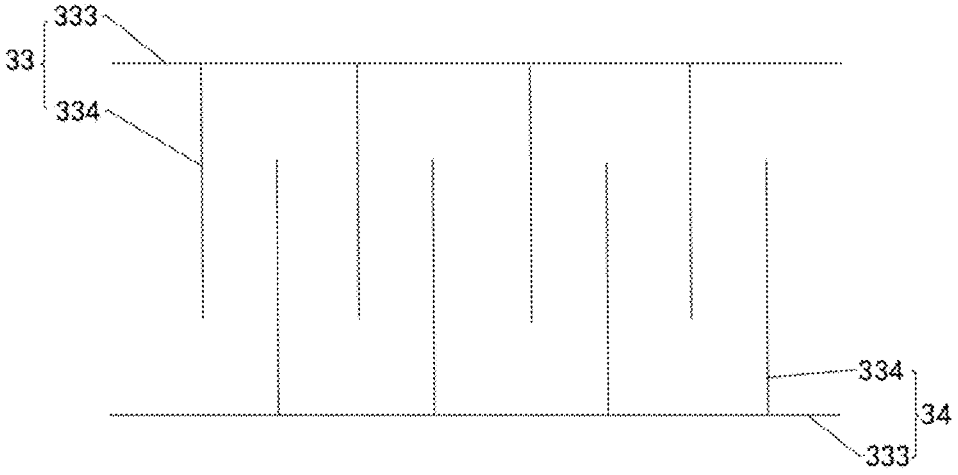
FIG. 14A is a diagram of structures of a first strip and a second strip shown in FIG. 3 in some other embodiments.
Figure 14B:
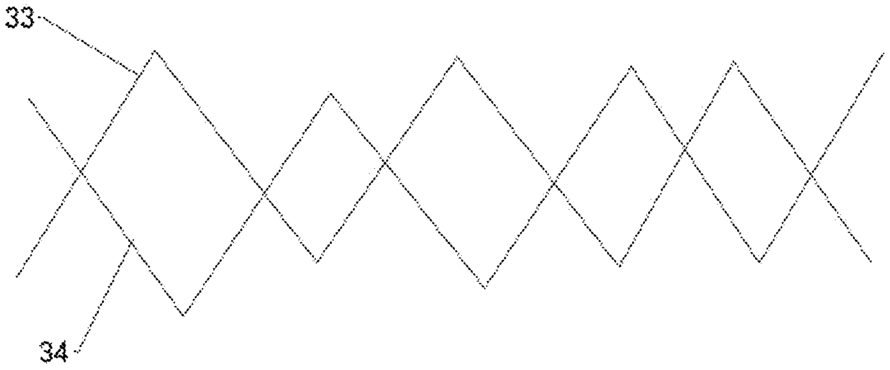
FIG. 14B is a diagram of structures of a first strip and a second strip shown in FIG. 3 in some other embodiments.

FIG. 14A is a diagram of structures of the first strip 33 and the second strip 34 shown in FIG. 3 in some other embodiments. FIG. 14B is a diagram of structures of the first strip 33 and the second strip 34 shown in FIG. 3 in some other embodiments.

For example, the first strip 33 and/or the second strip 34 may include a main body 333 and a branch 334. The main body 333 may be of a linear structure such as a straight line structure, a curve structure, a fold line structure, or a serpentine line structure. The branch 334 may be of a linear structure such as a straight line structure, a curve structure, a fold line structure, or a serpentine line structure. An included angle may exist between an extension direction of the branch 334 and an extension direction of the main body 333. It may be understood that the extension direction of the branch 334 is a direction in which one end of the branch 334 points to the other end, and the extension direction of the main body 333 is a direction in which one end of the main part 333 points to the other end.

For example, as shown in FIG. 14A, when each of the first strip 33 and the second strip 34 includes the main body 333 and the branch 334, the branch 334 of the first strip 33 and the branch 334 of the second strip 34 may be spaced. In some other embodiments, there may be a plurality of branches 334 of the first strip 33 and the second strip 34, and the plurality of branches 334 of the first strip 33 and the plurality of branches 334 of the second strip 34 may be arranged alternately. In some other embodiments, there may be a plurality of branches 334 of the first strip 33 or the second strip 34, and the branches 334 of the first strip 33 and the branches 334 of the second strip 34 may be spaced. This is not limited in this disclosure.

For example, the first strip 33 and the second strip 34 may be of a mirror-symmetric structure, and some regions of the first strip 33 and the second strip 34 may overlap. For example, as shown in FIG. 14B, both the first strip 33 and the second strip 34 may be of a fold line structure, and some regions of the first strip 33 and the second strip 34 overlap.

Figure 15A:
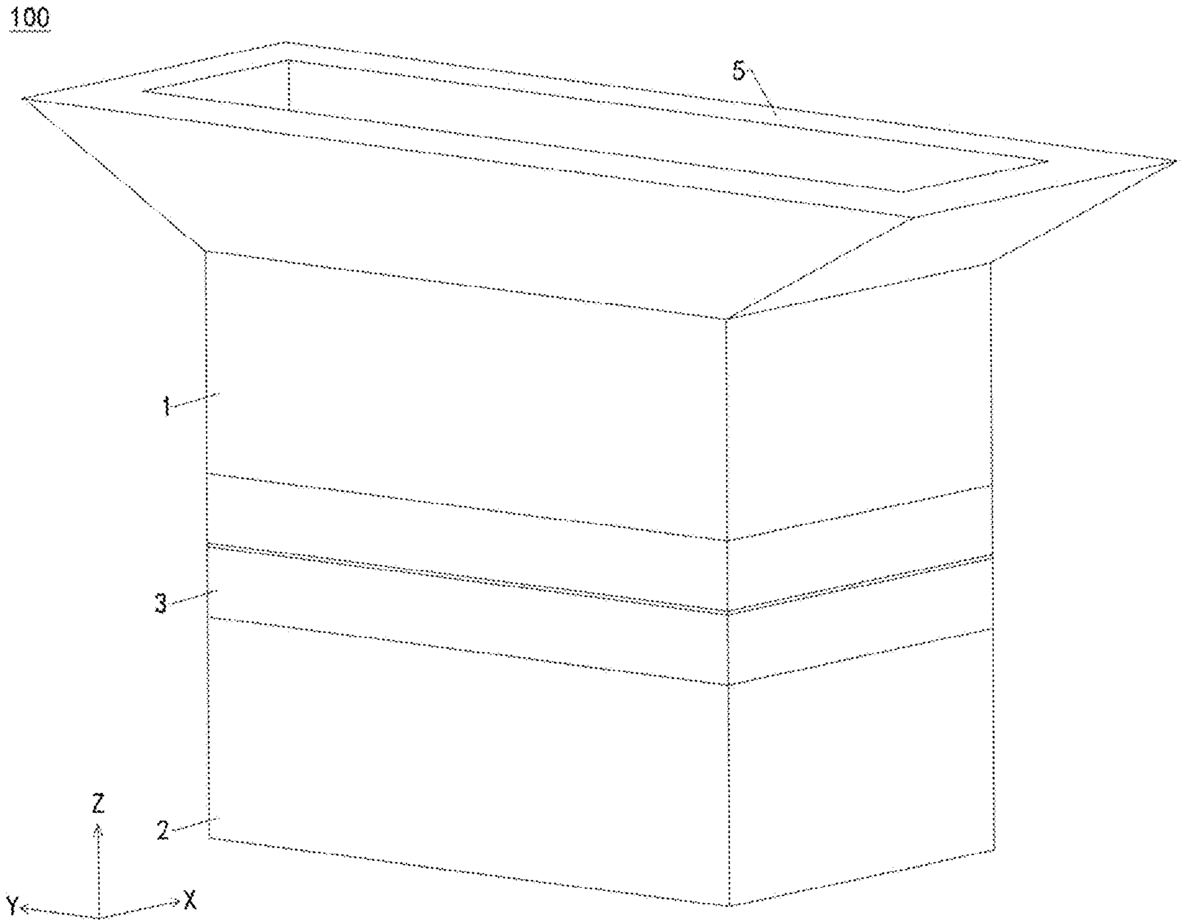
FIG. 15A is a diagram of a structure of a transformative apparatus according to some other embodiments of this disclosure.

For example, FIG. 15A is a diagram of a structure of the transformative apparatus 100 according to some other embodiments of this disclosure.

A horn antenna 5 may be disposed on a port on a side that is of the first waveguide 1 and/or the second waveguide 2 and that faces away from the planar transmission assembly 3, and a cross section area of the horn antenna 5 increases as a distance between the horn antenna 5 and the planar transmission assembly 3 increases. It may be understood that a cross section of the horn antenna 5 is a region enclosed by an outer contour that is of the horn antenna 5 and that is parallel to the first plane XY, and the cross section area of the horn antenna 5 is an area of the region enclosed by the outer contour that is of the horn antenna 5 and that is parallel to the first plane XY. The horn antenna 5 has a simple structure, a wide frequency band, and a large power capacity.

For example, a shape of the cross section of the horn antenna 5 may be a rectangle, a circle, a square, an ellipse, or an irregular shape. This is not limited in this disclosure.

In some other embodiments, an antenna structure of another type, such as a parabolic antenna, a horn parabolic antenna, a lens antenna, a slotted antenna, a dielectric antenna, or a periscope antenna, may alternatively be disposed on the port on the side that is of the first waveguide 1 and/or the second waveguide 2 that faces away from the planar transmission assembly 3. This is not limited in this disclosure.

Figure 15B:
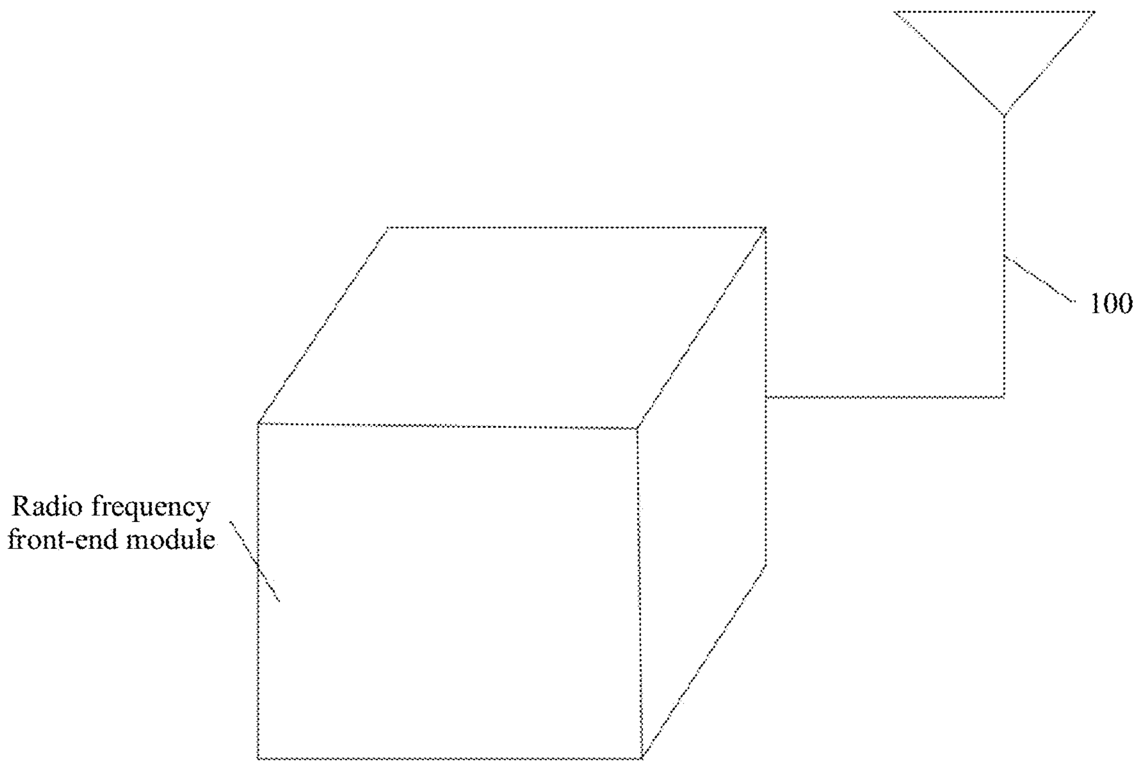
FIG. 15B is a diagram of the transformative apparatus shown in FIG. 15A in some disclosure environments.

In this embodiment, FIG. 15B is a diagram of the transformative apparatus 100 shown in FIG. 15A in some disclosure environments. The transformative apparatus 100 may be connected to a radio frequency front-end module. A microwave circuit (not shown in the figure) may be disposed inside the radio frequency front-end module. The planar transmission assembly 3 (not shown in the figure) of the transformative apparatus 100 may be connected to the microwave circuit, and an electrical signal processed by the circuit is transferred to the waveguide (the first waveguide 1 and/or the second waveguide 2, not shown in the figure), and is radiated by using a port of the waveguide, to reduce a transmission path loss and improve radiation efficiency.

Figure 16:
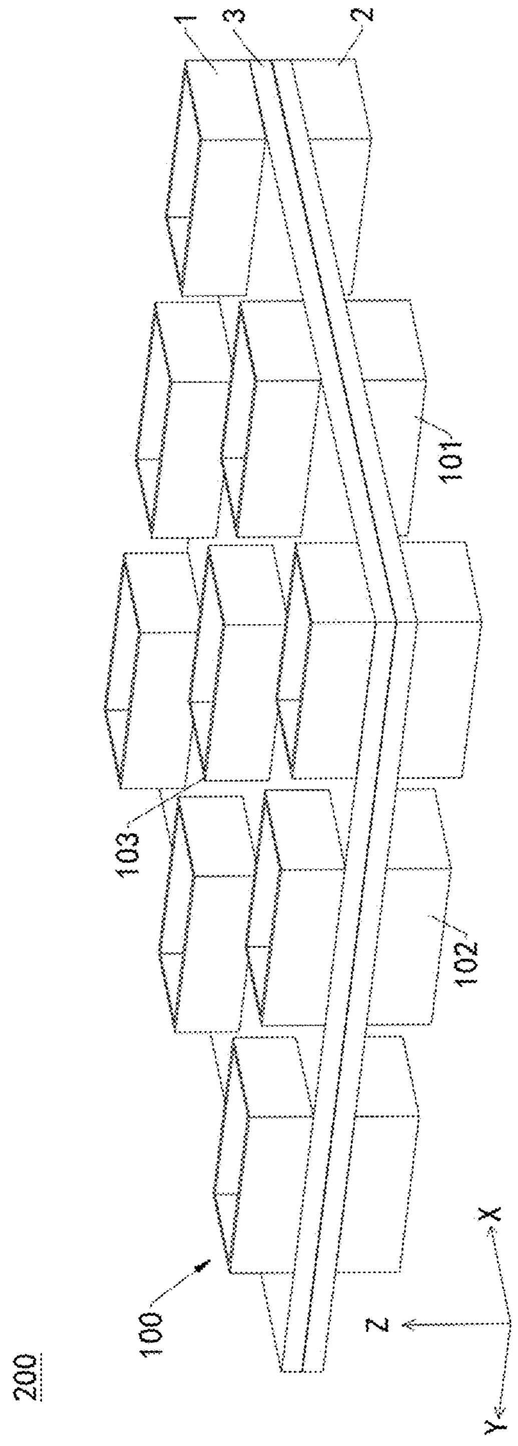
FIG. 16 is a diagram of an arrayed transformative apparatus according to this disclosure.

FIG. 16 is a diagram of an arrayed transformative apparatus 200 according to this disclosure.

For example, the arrayed transformative apparatus 200 may include a plurality of transformative apparatuses 100 that are shown in FIG. 1 and that are arranged in an array, to expand an disclosure scope. For example, the arrayed transformative apparatus 200 may include four, seven, nine, or any quantity of transformative apparatuses 100. This disclosure is described by using an example in which the arrayed transformative apparatus 200 includes nine transformative apparatuses 100, and the nine transformative apparatuses 100 are arranged in an array structure of three rows and three columns.

The plurality of transformative apparatuses 100 may be spaced in the first direction X and the second direction Y, where end surfaces of eight transformative apparatuses 100 located at the outermost periphery of the arrayed transformative apparatus 200 may be exposed relative to other transformative apparatus 100. In addition, the transformative apparatuses 100 located at the outermost periphery of the arrayed transformative apparatus 200 may include a first transformative apparatus 101 and a second transformative apparatus 102. An end surface that is of the first transformative apparatus 101 and that is perpendicular to the second direction Y is exposed relative to the arrayed transformative apparatus 200, and the planar transmission assembly 3 may be connected to an external communication device from the end surface that is of the first transformative apparatus 101 and that is perpendicular to the second direction Y. Specifically, the converter antenna 36 of the first transformative apparatus 101 of the planar transmission assembly 3 may be of a structure shown in FIG. 5. The input ends of the first strip 33 and the second strip 34 of the planar transmission assembly 3 may extend to the end surface that is of the planar transmission assembly 3 and that is perpendicular to the second direction Y, and are connected to the external communication device.

An end surface that is of the second transformative apparatus 102 and that is perpendicular to the first direction X is exposed relative to the arrayed transformative apparatus 200, and the planar transmission assembly 3 may be connected to an external communication device from the end surface that is of the second transformative apparatus 102 and that is perpendicular to the first direction X. Specifically, the converter antenna 36 of the second transformative apparatus 102 may be of the dual converter antenna 36*a* structure shown in FIG. 11. End parts of the first strip 33*a* and the second strip 34*a* of the planar transmission assembly 3*a* may extend to the end surface that is of the planar transmission assembly 3*a* and that is perpendicular to the first direction X1, and are connected to the external communication device.

In addition, a third transformative apparatus 103 is located on an inner side of a region enclosed by the first transformative apparatus 101 and the second transformative apparatus 102, and the planar transmission assembly 3 of the third transformative apparatus 103 may be connected to an external communication device from an end surface that is of the third transformative apparatus 103 and that is perpendicular to the third direction Z. Specifically, an adaptive design may be performed on the converter antenna 36 of the third transformative apparatus 103 of the planar transmission assembly 3 with reference to the structure of the converter antenna 36 of the first transformative apparatus 101. End parts of the first strip 33 and the second strip 34 of the planar transmission assembly 3 may extend to the end surface that is of the planar transmission assembly 3 and that is perpendicular to the third direction Z, and are connected to the external communication device.

The transformative apparatus 100 provided in this disclosure guides, by using the first guiding member 4, an electrical signal output by the converter antenna 36 into the first waveguide 1, to reduce a leakage of the electrical signal in a transfer process between different types of transmission lines. In this way, the transformative apparatus 100 has little impact on an external structure and is slightly affected by an external environment. Therefore, a small distance may be set between the plurality of transformative apparatuses 100 of the arrayed transformative apparatus 200. For example, the distance between the plurality of transformative apparatuses 100 may be one-fourth of a wavelength, where the wavelength is a wavelength of an electromagnetic wave propagated in the transformative apparatus 100. It may be understood that the distance between the plurality of transformative apparatuses 100 of the arrayed transformative apparatus 200 may alternatively be greater than one-fourth of a wavelength, for example, a half of a wavelength or 1.5 times of a wavelength. This is not limited in this disclosure. The plurality of transformative apparatuses 100 of the arrayed transformative apparatus 200 are closely arranged, so that the arrayed transformative apparatus 200 is small in size. This facilitates integration of the arrayed transformative apparatus 200, facilitates matching with a feed network, and reduces a radiation loss of the arrayed transformative apparatus 200.

In some embodiments, the arrayed transformative apparatus 200 may be configured to transmit electrical signals between different power modules. For example, output power of a microwave source is high, and use of the waveguide (e.g. the first waveguide 1) can withstand the high power and have a low loss. The transformative apparatus 100 may transmit an output signal and allocate power of the electrical signal, divide a high-power electrical signal into a plurality of low-power electrical signals, and connect to an external communication device by using a plurality of planar transmission assemblies 3 to process the signal.

Figure 17:
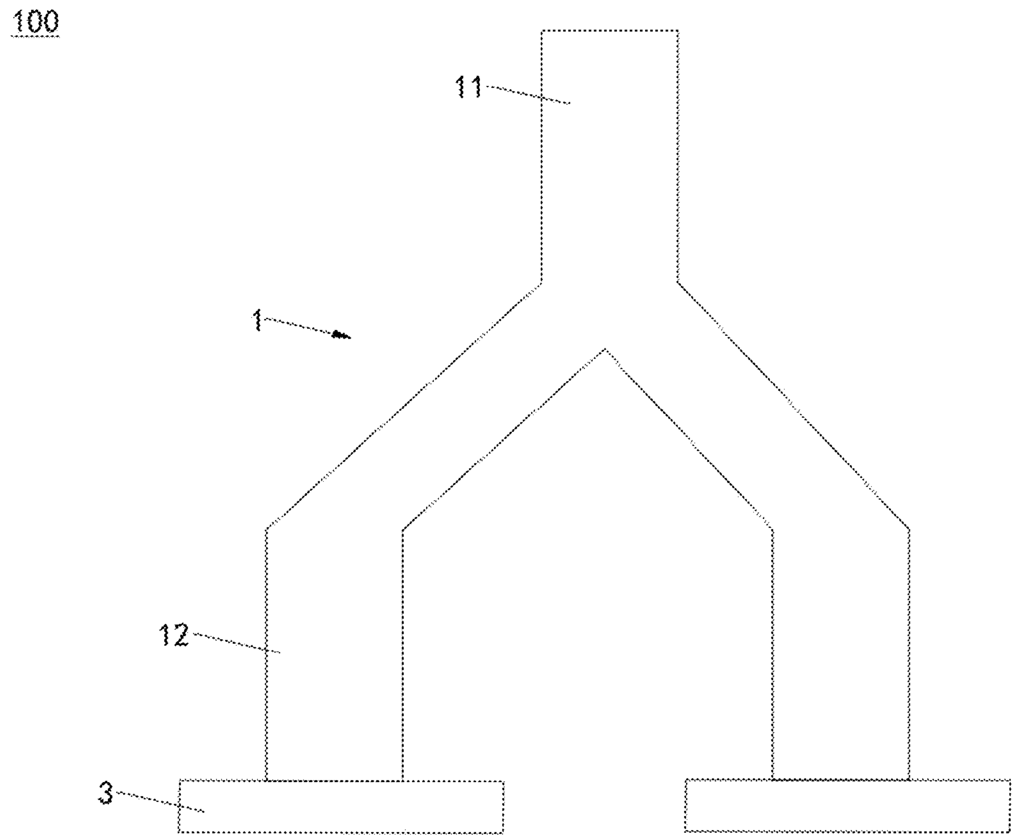
FIG. 17 is a diagram of a structure of a transformative apparatus in some other embodiments according to an embodiment of this disclosure.

For example, FIG. 17 is a diagram of a structure of the transformative apparatus 100 in some other embodiments according to an embodiment of this disclosure.

The first waveguide 1 may alternatively include one main waveguide 11 and a plurality of sub-waveguides 12, for example, two sub-waveguides 12, four sub-waveguides 12, five sub-waveguides 12, or the like. The plurality of sub-waveguides 12 are all connected to the main waveguide 11, there may be a plurality of planar transmission assemblies 3 and a plurality of second waveguides 2, and both a quantity of planar transmission assemblies 3 and a quantity of second waveguides 2 are equal to a quantity of sub-waveguides 12. Each sub-waveguide 12 corresponds to one planar transmission assembly 3, or one planar transmission assembly 3 and one second waveguide (not shown in the figure). It may be understood that a boundary condition of the waveguide determines a mode of an electrical signal transmitted on the waveguide, and the sub-waveguide 12 may provide a favorable additional boundary condition for another adjacent sub-waveguide 12, so that the another sub-waveguide 12 has a boundary condition for reducing an electrical signal leakage. This further reduces a leakage of the electrical signal in a transfer process from the first waveguide 1 to the planar transmission assembly 3, so that the electrical signal can be stably and efficiently transmitted. In addition, the main waveguide 11 may be connected to an external microwave source, an input electrical signal output by the external microwave source may be transmitted to the plurality of sub-waveguides 12 along the main waveguide 11, and the input electrical signal is divided into a plurality of electrical signals, and the plurality of electrical signals are respectively transmitted along the plurality of sub-waveguides 12. Power of the plurality of electrical signals is less than power of the input electrical signal, and power of an electrical signal output from the external microwave source is high. Power allocation may be implemented by using the plurality of sub-waveguides 12.

For example, the plurality of sub-waveguides 12 may include a first sub-waveguide (not shown in the figure) and a second sub-waveguide (not shown in the figure), and the second sub-waveguide is connected between the first sub-waveguide and the planar transmission assembly 3. A quantity of first sub-waveguides is less than a quantity of second sub-waveguides, and each first sub-waveguide corresponds to at least one second sub-waveguide. That is, the main waveguide, the first sub-waveguide, and the second sub-waveguide may form a tree-shaped bifurcation structure. This is not limited in this disclosure.

This embodiment may be applied to a communication apparatus having a plurality of separated transmission lines, for example, a phased array antenna. In addition, in this embodiment, the input electrical signal can be divided into a plurality of electrical sub-signals by using the plurality of sub-waveguides 12, and the plurality of divided electrical sub-signals are respectively transmitted to corresponding planar transmission assemblies 3, to simultaneously implement a plurality of processing requirements for the electrical signal.

Figure 18A:
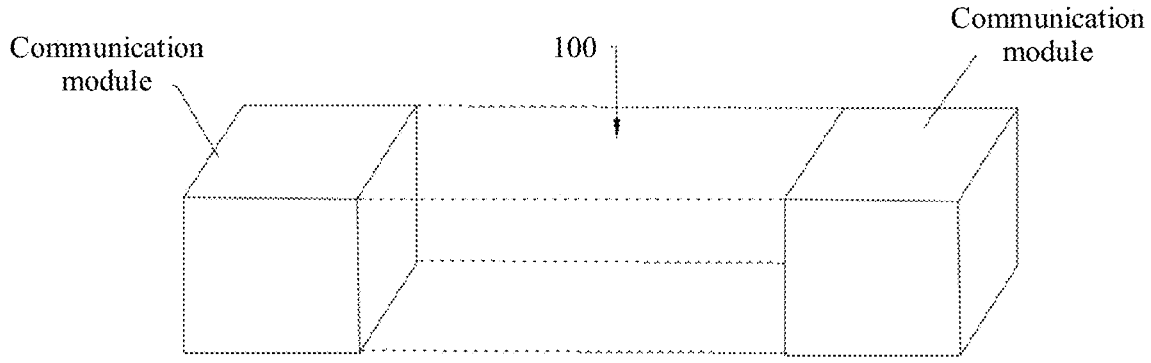
FIG. 18A is a diagram of some application scenarios of a transformative apparatus according to an embodiment of this disclosure.

In some embodiments, FIG. 18A is a diagram of some application scenarios of the transformative apparatus 100 according to an embodiment of this disclosure. Dashed lines in FIG. 18A represent signal transmission between communication modules. The transformative apparatus 100 may be configured to perform transmission between communication modules with the same power, to implement short-distance transmission between different communication modules, reduce a transmission loss, and improve transmission efficiency.

Figure 18B:
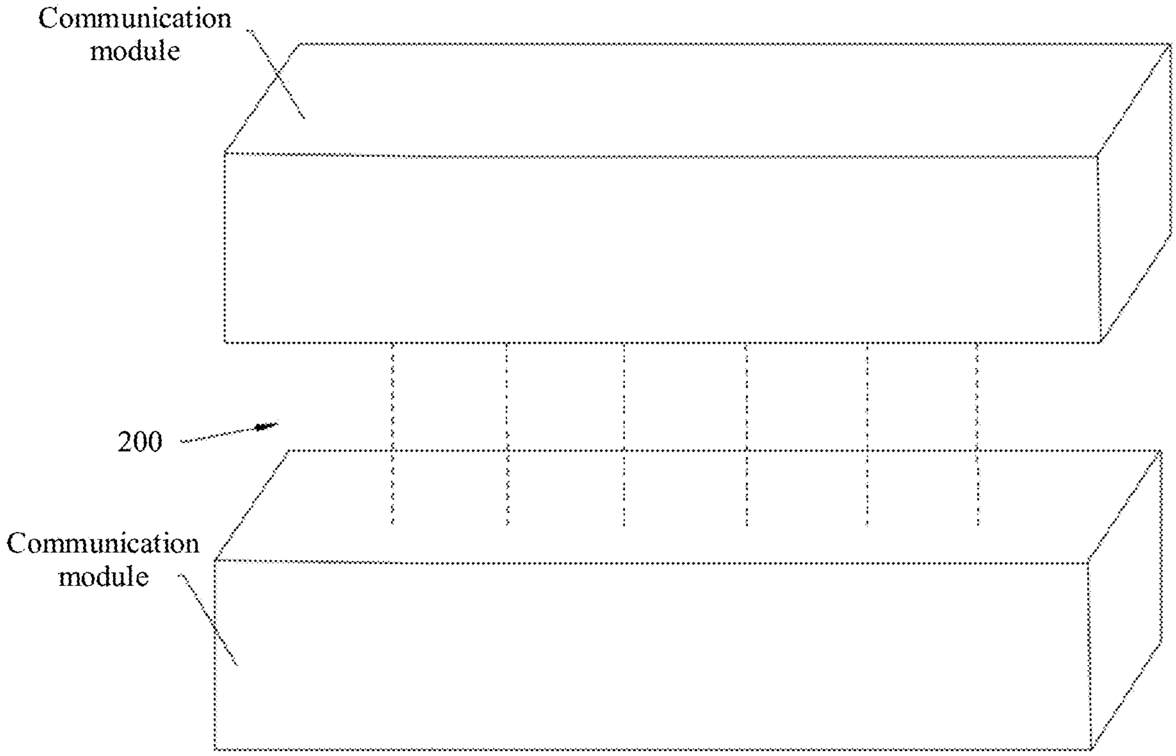
FIG. 18B is a diagram of some application scenarios of an arrayed transformative apparatus according to an embodiment of this disclosure.

In some embodiments, FIG. 18B is a diagram of some application scenarios of the arrayed transformative apparatus 200 according to an embodiment of this disclosure. Dashed lines in FIG. 18B represent signal transmission between communication modules. The arrayed transformative apparatus 200 may be configured to perform transmission between communication modules with the same power, to implement arrayed transmission between different communication modules, reduce a transmission loss, and improve transmission efficiency.

The foregoing descriptions are merely specific implementations and embodiments of this disclosure, but are not intended to limit the protection scope of this disclosure. Any variation or replacement readily figured out by a person skilled in the art within the technical scope disclosed in this disclosure shall fall within the protection scope of this disclosure. Embodiments in this disclosure and the features in embodiments may be mutually combined in a case of no conflict. Therefore, the protection scope of this disclosure shall be subject to a protection scope of the claims.

What is claimed is:

1. A transformative apparatus, comprising:
- a first substrate, a transmission member, a converter antenna, a first waveguide, and a first guiding member;
- wherein the first waveguide is disposed on a first side of the first substrate, the transmission member and the converter antenna are disposed on a second side of the first substrate,
- the transmission member is configured to transmit an electrical signal having a first mode,
- the converter antenna is configured to:
  - receive the electrical signal from the transmission member,
  - form local radiation, and
  - excite an electrical signal having a second mode in the first waveguide, and the first waveguide is configured to transmit the electrical signal having the second mode; and
- the first guiding member is disposed between the first substrate and the first waveguide, an extension direction of the first guiding member is a first direction, the first direction is parallel to a polarization direction of the second mode, and the first guiding member is configured to guide an electrical signal output from the converter antenna into the first waveguide.

2. The transformative apparatus according to claim 1, wherein the first waveguide comprises a hollow metal structure, and the first guiding member is connected to the hollow metal structure, or the first guiding member is located inside the hollow metal structure.

3. The transformative apparatus according to claim 1, wherein a region of a projection of the first waveguide onto a first plane is a first projection region, the first plane is parallel to a surface that is of the first substrate and that faces the first waveguide, and at least a part of the first guiding member falls into the first projection region.

4. The transformative apparatus according to claim 3, wherein the converter antenna comprises a first radiator and a second radiator, and extension directions of the first radiator and the second radiator are both parallel to the first direction.

5. The transformative apparatus according to claim 4, wherein a region of projections of the first radiator and the second radiator onto the first plane is a second projection region, and at least a second part of the first guiding member falls into the second projection region.

6. The transformative apparatus according to claim 5, wherein the first guiding member, the first radiator, and the second radiator are all of a bar-like structure, and a middle line of the first guiding member coincides with one or more of a middle line of the first radiator or a middle line of the second radiator.

7. The transformative apparatus according to claim 3, wherein the transformative apparatus further comprises a second waveguide, the second waveguide is located on a side that is of the transmission member and the converter antenna and that faces away from the first substrate, and the second waveguide is fastened to the first substrate.

8. The transformative apparatus according to claim 7, further comprising a planar transmission assembly, the planar transmission assembly comprises the first substrate, the transmission member, the converter antenna, and the first guiding member, and a manner of disposing between the first waveguide and the planar transmission assembly is the same as a manner of fastening between the planar transmission assembly and the second waveguide.

9. The transformative apparatus according to claim 8, wherein the first waveguide falls into a range of a region of a projection of the first substrate onto the first plane.

10. The transformative apparatus according to claim 7, further comprising a second substrate and an adjustable material layer, wherein the second substrate is disposed to the first substrate and is disposed opposite to the first substrate, the second substrate is located on the side that is of the transmission member and the converter antenna and that faces away from the first substrate, and the adjustable material layer is filled between the first substrate and the second substrate.

11. The transformative apparatus according to claim 10, further comprising a second guiding member, wherein the second guiding member is located between the second substrate and the second waveguide, an electrical signal transmitted in the second waveguide has the second mode, and an extension direction of the second guiding member is parallel to the first direction, and the second guiding member is configured to guide the electrical signal output from the converter antenna into the second waveguide.

12. The transformative apparatus according to claim 1, wherein the converter antenna comprises a first radiator and a second radiator:

the first radiator comprises a first portion, a second portion, and a third portion that are sequentially connected, the first portion, the second portion, and the third portion of the first radiator form a U shape, the second radiator comprises a first portion, a second portion, and a third portion that are sequentially connected, the first portion, the second portion, and the third portion of the second radiator form an inverse U shape, wherein extension directions of the first portion of the first radiator and the first portion of the second radiator are both parallel to the first direction, the first portion of the first radiator and the first portion of the second radiator form a first converter antenna, and wherein extension directions of the third portion of the first radiator and the third portion of the second radiator are both parallel to the first direction, and the third portion of the first radiator and the third portion of the second radiator form a second converter antenna; and there are two first guiding members, and the two first guiding members are respectively disposed corresponding to the first converter antenna and the second converter antenna.

13. An arrayed transformative apparatus, comprising a plurality of transformative apparatuses, one of the plurality of transformative apparatuses, comprising:

a first substrate, a transmission member, a converter antenna, a first waveguide, and a first guiding member;

wherein the first waveguide is disposed on a first side of the first substrate, the transmission member and the converter antenna are disposed on a second side of the first substrate, the transmission member is configured to transmit an electrical signal having a first mode, the converter antenna is configured to:

receive the electrical signal from the transmission member, form local radiation, and excite an electrical signal having a second mode in the first waveguide, and the first waveguide is configured to transmit the electrical signal having the second mode; and the first guiding member is disposed between the first substrate and the first waveguide, an extension direction of the first guiding member is a first direction, the first direction is parallel to a polarization direction of the second mode, and the first guiding member is configured to guide an electrical signal output from the converter antenna into the first waveguide.

14. The arrayed transformative apparatus according to claim 13, wherein the first waveguide comprises a hollow metal structure, and the first guiding member is connected to the hollow metal structure, or the first guiding member is located inside the hollow metal structure.

15. The arrayed transformative apparatus according to claim 13, wherein a region of a projection of the first waveguide onto a first plane is a first projection region, the first plane is parallel to a surface that is of the first substrate and that faces the first waveguide, and at least a part of the first guiding member falls into the first projection region.

16. The arrayed transformative apparatus according to claim 15, wherein the converter antenna comprises a first radiator and a second radiator, and extension directions of the first radiator and the second radiator are both parallel to the first direction.

17. The arrayed transformative apparatus according to claim 16, wherein a region of projections of the first radiator and the second radiator onto the first plane is a second projection region, and at least a second part of the first guiding member falls into the second projection region.

18. The transformative apparatus according to claim 17, wherein the first guiding member, the first radiator, and the second radiator are all of a bar-like structure, and a middle line of the first guiding member coincides with one or more of a middle line of the first radiator or a middle line of the second radiator.

19. The transformative apparatus according to claim 15, wherein the transformative apparatus further comprises a second waveguide, the second waveguide is located on a side that is of the transmission member and the converter antenna and that faces away from the first substrate, and the second waveguide is fastened to the first substrate.

20. The transformative apparatus according to claim 19, further comprising a planar transmission assembly, the planar transmission assembly comprises the first substrate, the transmission member, the converter antenna, and the first guiding member, and a manner of disposing between the first waveguide and the planar transmission assembly is the same as a manner of fastening between the planar transmission assembly and the second waveguide.

* * * * *